US011796708B2

United States Patent
Aramaki et al.

(10) Patent No.: US 11,796,708 B2
(45) Date of Patent: Oct. 24, 2023

(54) CAPACITANCE SENSING DEVICE AND IMAGE READING DEVICE

(71) Applicant: Mitsubishi Electric Corporation, Tokyo (JP)

(72) Inventors: Toru Aramaki, Tokyo (JP); Hiroshi Araki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 401 days.

(21) Appl. No.: 17/285,489

(22) PCT Filed: Sep. 18, 2019

(86) PCT No.: PCT/JP2019/036474
§ 371 (c)(1),
(2) Date: Apr. 15, 2021

(87) PCT Pub. No.: WO2020/115987
PCT Pub. Date: Jun. 11, 2020

(65) Prior Publication Data
US 2021/0325559 A1    Oct. 21, 2021

(30) Foreign Application Priority Data

Dec. 5, 2018 (JP) ................. 2018-228162

(51) Int. Cl.
*G01V 3/08* (2006.01)
*G07D 7/026* (2016.01)
*H04N 1/00* (2006.01)

(52) U.S. Cl.
CPC ............. *G01V 3/088* (2013.01); *G07D 7/026* (2013.01); *H04N 1/00795* (2013.01)

(58) Field of Classification Search
CPC ..... G01V 3/088; G07D 7/026; H04N 1/00795
(Continued)

(56) References Cited

U.S. PATENT DOCUMENTS 6,229,317 B1    5/2001  Barchuk
6,486,673 B1 *  11/2002 Goldfine ................ G01V 3/088
                                                      324/688
(Continued)

FOREIGN PATENT DOCUMENTS

JP        8-110967 A    4/1996
JP     2001-240271 A    9/2001
(Continued)

OTHER PUBLICATIONS

International Search Report and Written Opinion dated Oct. 29, 2019, received for PCT Application PCT/JP2019/036474, Filed on Sep. 18, 2019, 11 pages including English Translation.

*Primary Examiner* — Giovanni Astacio-Oquendo
(74) *Attorney, Agent, or Firm* — XSENSUS LLP

(57) ABSTRACT

An electrostatic capacitance detection device includes a first electrode, and a second electrode at least a part of which is opposed to the first electrode across a transport path extending in a transport direction in which a detection target having a sheet shape is transported. The first electrode and the second electrode extend in a cross direction intersecting the transport direction and have mutually different shapes. Alternatively, the electrostatic capacitance detection device further includes a first floating electrode disposed on the side of the first electrode opposite to the transport path, and a second floating electrode disposed on the side of the second electrode opposite to the transport path. Alternatively, at least one of the first electrode or the second electrode is provided with a first electric field adjuster or a second electric field adjuster.

18 Claims, 32 Drawing Sheets

(58) Field of Classification Search
USPC .................................. 324/686, 658, 649, 600
See application file for complete search history.

(56) References Cited

U.S. PATENT DOCUMENTS

| | | | |
|---|---|---|---|
| 8,049,451 B2* | 11/2011 | Patterson | G01V 3/088 |
| | | | 318/264 |
| 2015/0042353 A1 | 2/2015 | Jang et al. | |
| 2019/0088065 A1 | 3/2019 | Kagano et al. | |
| 2019/0139349 A1* | 5/2019 | Kagano | G07D 7/026 |

FOREIGN PATENT DOCUMENTS

| | | |
|---|---|---|
| JP | 2002-536751 A | 10/2002 |
| JP | 2018-92655 A | 6/2018 |
| WO | 2018/056443 A1 | 3/2018 |

* cited by examiner

CAPACITANCE SENSING DEVICE AND IMAGE READING DEVICE

CROSS-REFERENCE TO RELATED APPLICATIONS

The present application is based on PCT filing PCT/JP2019/036474, filed Sep. 18, 2019, which claims priority to JP 2018-228162, filed Dec. 5, 2018, the entire contents of each are incorporated herein by reference.

TECHNICAL FIELD

The present disclosure relates to an electrostatic capacitance detection device for detecting a change in electrostatic capacitance between electrodes caused by a detection target having a sheet shape, such as a bank note or security, and an image reading apparatus equipped with this electrostatic capacitance detection device.

BACKGROUND ART

Some of the existing electrostatic capacitance detection devices include a first electrode and a second electrode at least parts of which are opposed to each other across a transport path (for example, refer to Patent Literature 1). In the electrostatic capacitance detection device disclosed in Patent Literature 1, an oscillation circuit causes an electric field to be formed between the first electrode and the second electrode. A detection circuit detects a change in electrostatic capacitance between the first electrode and the second electrode. At least one of the oscillation circuit or the detection circuit is mounted on a first substrate and a second substrate.

In some existing paper sheet discriminating apparatuses equipped with electrostatic capacitance detection devices, the electrodes have three-dimensional shapes, and the end faces of the electrodes are rounded or chamfered (for example, refer to Patent Literature 2). The paper sheet discriminating apparatus disclosed in Patent Literature 2 equalizes the electric field between the electrodes and reduces the change in electrostatic capacitance between the electrodes caused by vertical displacement of a detection target transported between the electrodes.

CITATION LIST

Patent Literature

Patent Literature 1: International Publication No. WO 2018/056443
Patent Literature 2: Unexamined Japanese Patent Application Publication No. 2001-240271

SUMMARY OF INVENTION

Technical Problem

Unfortunately, the existing technique disclosed in Patent Literature 2 needs processing of the three-dimensional electrodes to equalize the electric field between the electrodes. In contrast, the existing technique disclosed in Patent Literature 1 has no reference to processing of three-dimensional electrodes.

An objective of the disclosure, which has been accomplished in view of the above situations, is to stabilize the electric field between electrodes or output in an electrostatic capacitance detection device or an image reading apparatus equipped with the electrostatic capacitance detection device.

Solution to Problem

In order to achieve the above objective, an electrostatic capacitance detection device or an image reading apparatus equipped with the electrostatic capacitance detection device according to the present disclosure detects a change in electrostatic capacitance based on an electric field formed between electrodes. The electrostatic capacitance detection device or the image reading apparatus includes a first electrode corresponding to one of the electrodes, and a second electrode corresponding to the other of the electrodes, at least a part of which is opposed to the first electrode across a transport path extending in a transport direction in which a detection target having a sheet shape is transported. The first electrode and the second electrode extend in a cross direction intersecting the transport direction and have mutually different shapes. Alternatively, the electrostatic capacitance detection device or the image reading apparatus further includes a first floating electrode disposed on the side of the first electrode opposite to the transport path, and a second floating electrode disposed on the side of the second electrode opposite to the transport path. Alternatively, at least one of the first electrode or the second electrode is provided with a first electric field adjuster or a second electric field adjuster.

Advantageous Effects of Invention

The disclosure can stabilize the electric field between the electrodes or output because of the shapes of the first electrode and the second electrode or because of conductors disposed around the first electrode and the second electrode.

DESCRIPTION OF EMBODIMENTS

Figure 1:
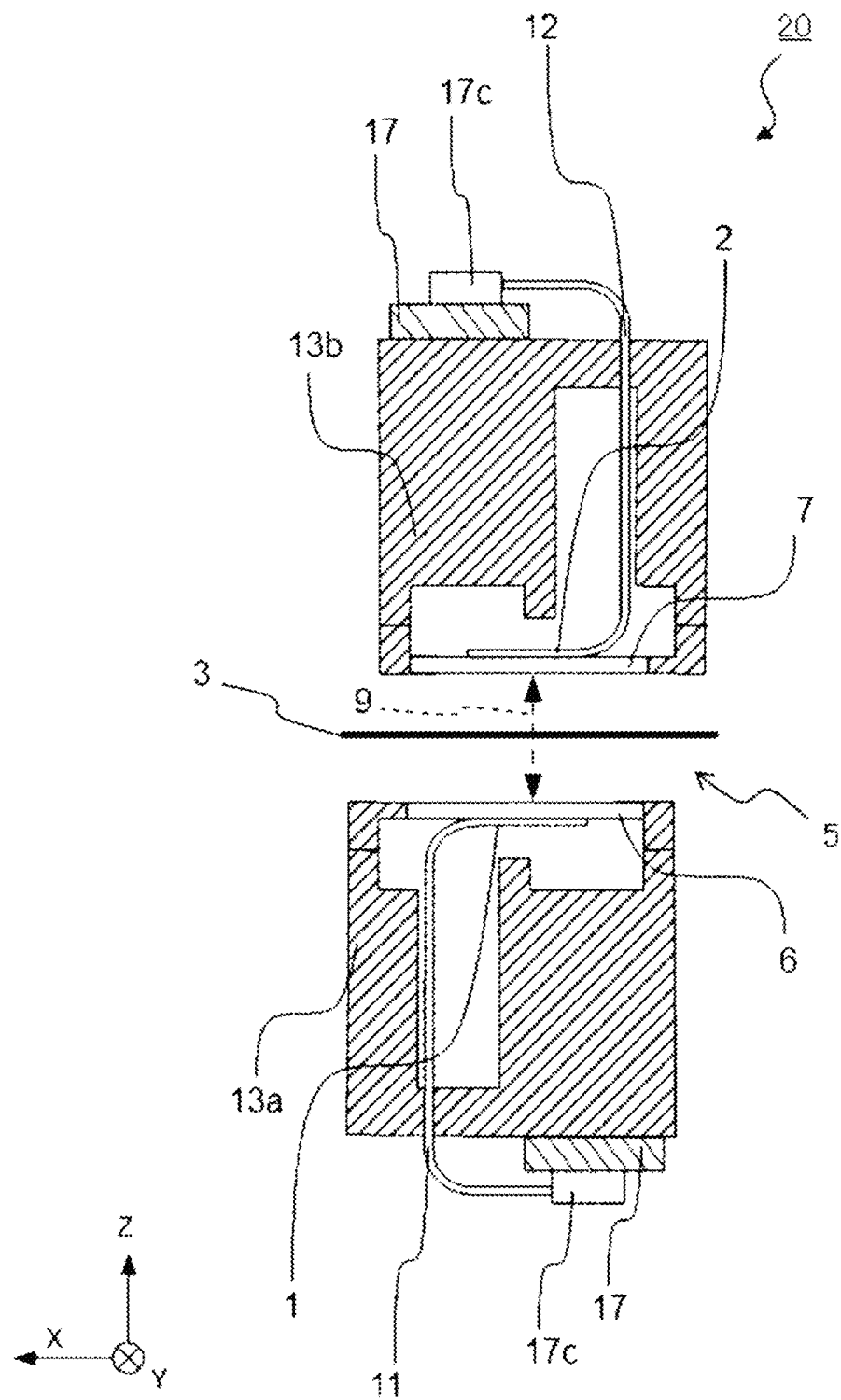
FIG. 1 is a cross-sectional view of an electrostatic capacitance detection device according to Embodiment 1 along the plane defined by the transport direction and the electric field direction.

Embodiments of the disclosure are now described with reference to the drawings. In these embodiments, the corresponding components are provided with the same reference symbol without redundant description in some contexts. In the drawings, the X-axis direction indicates the transport direction (short-side direction or sub-scanning direction) in which a detection target is transported. The Y-axis direction indicates the arrangement direction (long-side direction, cross direction, or main scanning direction) that intersects (is orthogonal to) the transport direction on the transport plane. The Z-axis direction indicates the electric field direction (height direction of an electrostatic capacitance detection device or an image reading apparatus) that is orthogonal to the X-axis and Y-axis directions. The transport direction indicates not only the direction in which a detection target is transported but also the direction in which the electrostatic capacitance detection device or the image reading apparatus travels relative to a fixed detection target. The arrangement direction is also called the main scanning direction. The transport direction is also called the sub-scanning direction. The electric field direction is also called the optical axis direction. The main scanning direction, the sub-scanning direction, and the optical axis direction are described in detail in the below description of the image reading apparatus.

Embodiment 1

An electrostatic capacitance detection device 20 (image reading apparatus 40) according to Embodiment 1 is now described with reference to FIGS. 1 to 18. The electrostatic capacitance detection device 20 (image reading apparatus 40) according to Embodiment 1 detects a change in electrostatic capacitance based on an electric field formed between electrodes. The electrostatic capacitance detection device 20 includes a first electrode 1 corresponding to one of the electrodes, and a second electrode 2 corresponding to the other of the electrodes, at least a part of which is opposed to the first electrode 1 across a transport path 5 extending in the transport direction in which a detection target 3 having a sheet shape is transported. The first electrode 1 and the second electrode 2 include conductive patterns defining the profiles of the electrodes, extend in the cross direction intersecting the transport direction, and have mutually different shapes. Alternatively, the electrostatic capacitance detection device 20 further includes a first floating electrode 1f disposed on the side of the first electrode 1 opposite to the transport path 5, and a second floating electrode 2f disposed on the side of the second electrode 2 opposite to the transport path 5.

Figure 2:
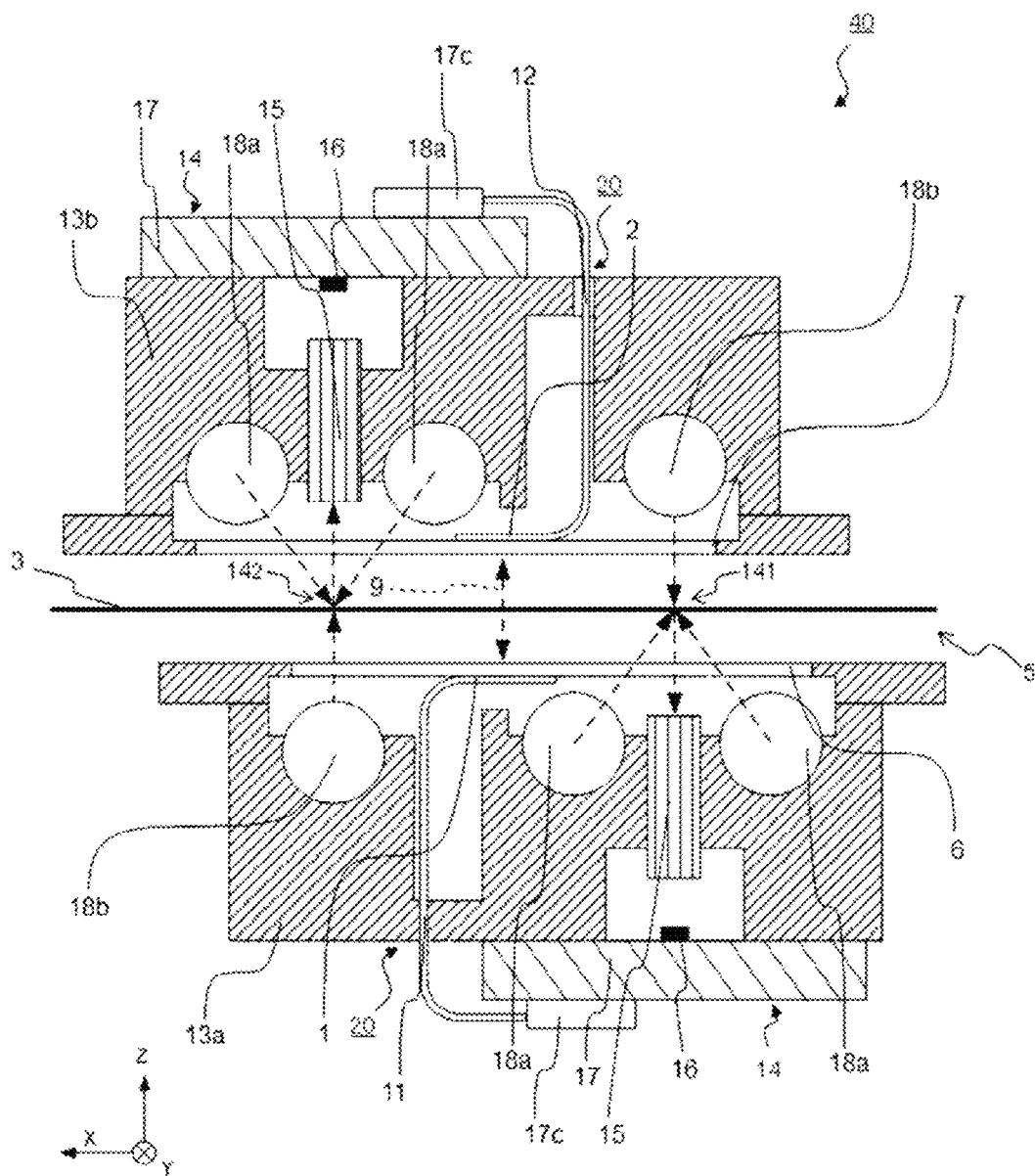
FIG. 2 is a cross-sectional view of an image reading apparatus (electrostatic capacitance detection device) according to Embodiment 1 along the plane defined by the transport direction and the electric field direction.

A basic configuration of the electrostatic capacitance detection device 20 (image reading apparatus 40) according to Embodiment 1 is now described with reference to FIGS. 1 to 5. In FIGS. 1 and 2, the first electrode 1 and the second electrode 2 are opposed to each other across the transport path 5 extending in the transport direction in which the detection target 3 having a sheet shape is transported. The detection target 3 is transported in the positive X-axis direction. The positive X-axis direction indicates the direction toward the positive side of the X-axis direction directed from the upstream side to the downstream side in the transport direction. Examples of the detection target 3 include printed matters, such as bank notes and securities. A first flat plate 6 is an insulating flat plate that is provided with the first electrode 1. A second flat plate 7 is an insulating flat plate that is provided with the second electrode 2. The first electrode 1 and the second electrode 2 may be fabricated by a printing technique.

Each of the first electrode 1 and the second electrode 2 includes conductive pattern having a length of several millimeters to several centimeters in the transport direction. The first electrode 1 and the second electrode 2 does not necessarily have the same length in the transport direction. At least parts of the first electrode 1 and the second electrode 2 have only to be opposed to each other in the electric field direction. In other words, at least parts of the first electrode 1 and the second electrode 2 in the transport direction are overlapped with each other. That is, the first electrode 1 and the second electrode 2 may be deviated from each other in the transport direction provided that these electrodes function as a parallel-plate capacitor. Also, the first electrode 1 and the second electrode 2 may be deviated from each other in the arrangement direction (cross direction). At least one of the first electrode 1 or the second electrode 2 may include an integrated conductive pattern continuous in the arrangement direction (cross direction).

In FIGS. 1 and 2, an oscillation circuit causes an electric field 9 to be formed between the first electrode 1 and the second electrode 2. The electric field 9 is thus formed by the oscillation circuit in at least a part of the space within the transport path 5. In these figures, the electric field 9 is indicated by the broken lines with arrows at both ends. The electric field 9 is formed substantially in the Z-axis direction. In other words, the electric field 9 is formed in a predetermined gap, between the first flat plate 6 and the second flat plate 7, that is, gap d. The gap d indicates the distance in the electric field direction between the first flat plate 6 and the second flat plate 7. The gap d is not illustrated in the figures. A detection circuit detects a change in electrostatic capacitance between the first electrode 1 and the second electrode 2. At least one of the oscillation circuit or the detection circuit is mounted on a first substrate 11 and a second substrate 12. According to the embodiments of the disclosure, the first electrode 1 serves as a receiving electrode and the second electrode 2 serves as a transmitting electrode. In the example illustrated in FIG. 1, the first substrate 11 and the second substrate 12 are made of flexible substrates. The first substrate 11 and the second substrate 12 made of flexible substrates are described below.

In FIGS. 1 and 2, a housing 13a and a housing 13b serve as housings of the electrostatic capacitance detection device 20. Particularly in FIG. 2, the housings 13a and 13b serve also as housings of the image reading apparatus 40. The housing 13a accommodates the first substrate 11 therein. The housing 13b accommodates the second substrate 12 therein. The first substrate 11 and the second substrate 12 are circuit boards extending in the electric field direction. The following description assumes that the oscillation circuit is mounted on the first substrate 11 while the detection circuit is mounted on the second substrate 12. Needless to mention, the detection circuit may also be mounted on the first substrate 11 while the oscillation circuit may be mounted on the second substrate 12. The first flat plate 6 equipped with the first electrode 1 inside the housing 13a is provided on the surface of the housing 13a adjacent to the transport path 5. The second flat plate 7 equipped with the second electrode 2 inside the housing 13b is provided on the surface of the housing 13b adjacent to the transport path 5. The transport path 5 means a space between the housings 13a and 13b through which the detection target 3 passes. The gap d means the distance between the housings 13a and 13b in the electric field direction.

In the electrostatic capacitance detection device 20 illustrated in FIG. 1, the detection target 3 is transported in the transport direction through the transport path 5 between the first flat plate 6 and the second flat plate 7 disposed with the gap d. In this configuration, the first electrode 1 (first flat plate 6) and the second electrode 2 (second flat plate 7) constitute a parallel-plate capacitor having the gap d and form the electric field 9 within the transport path 5. In response to insertion of the dielectric detection target 3 in the parallel-plate capacitor, the amount of accumulated electric charge increases, resulting in a change in electrostatic capacitance of the parallel-plate capacitor. This change in electrostatic capacitance of the parallel-plate capacitor can be detected by the oscillation circuit and the detection circuit. When the electrostatic capacitance to be detected is known in advance, the transported detection target 3 can be identified based on the detected electrostatic capacitance.

This function of identifying the detection target 3 may be performed by the detection circuit. Alternatively, the identifying function may be performed by a discrimination circuit outside the detection circuit. The discrimination circuit is described in detail below. In the case where any dielectric foreign object, such as a piece of tape, adheres to the detection target 3, the amount of accumulated electric charge in the parallel-plate capacitor becomes larger than that in the case of no foreign object, resulting in an increase in electrostatic capacitance.

Accordingly, the insulating first flat plate 6 and the insulating second flat plate 7 in the electrostatic capacitance detection device 20 have the characteristics as follows. The first flat plate 6 is disposed between the first electrode 1 and the transport path 5. The second flat plate 7 is disposed between the second electrode 2 and the transport path 5. That is, the first electrode 1 does not necessarily be mounted directly on the first flat plate 6 and the second electrode 2 does not necessarily be mounted directly on the second flat plate 7. As illustrated in FIG. 1, the first electrode 1 may also be mounted on the first substrate 11 made of a flexible substrate in the electrostatic capacitance detection device 20 according to the embodiments of the present disclosure. Similarly, the second electrode 2 may also be mounted on the second substrate 12.

In this case, the first substrate 11 has a portion extending in the electric field direction, in which at least parts of the first electrode 1 and the second electrode 2 are opposed to each other, other than the portion provided with the first electrode 1. Also, the second substrate 12 has a portion extending in the electric field direction, in which at least parts of the first electrode 1 and the second electrode 2 are opposed to each other, other than the portion provided with the second electrode 2. The first electrode 1 and the second electrode 2 are urged or bonded on the first flat plate 6 and the second flat plate 7, respectively. The first electrode 1 and the second electrode 2 urged or bonded on the first flat plate 6 and the second flat plate 7 are deemed to be provided to the first flat plate 6 and the second flat plate 7, respectively.

In the electrostatic capacitance detection device 20 in FIG. 2, the first electrode 1 and the second electrode 2 are located at a position downstream of a first image reader, which reads an image of the detection target 3 at a first reading position 141, in the transport direction within the transport path 5. The first electrode 1 and the second electrode 2 are located at a position upstream of a second image reader, which reads an image of the detection target 3 at a second reading position 142, in the transport direction within the transport path 5. The first electrode 1 and the second electrode 2 are thus located between the first reading position 141 and the second reading position 142. The image reading apparatus 40 is equipped with the electrostatic capacitance detection device 20, the first image reader, and the second image reader.

In FIG. 2, a housing 13c serves as a housing of the image reading apparatus 40 disposed on the same side as the housing 13b among the housings 13a and 13b opposed to each other across the transport path 5. The housing 13c accommodates a lens element (imaging optical lens) 15, a sensor element (light receiving element) 16, and light sources 18a therein. The housing 13c is also provided with a circuit board 17 on the side opposite to the transport path 5. The first image reader and the second image reader have the identical basic configuration and each function as an image reader 14. The image reader 14 indicates at least the sensor element 16. Alternatively, the image reader 14 may indicate the sensor element 16 and at least one of the lens element 15, the light sources 18a, or the circuit board 17. The circuit board 17 may also function as a circuit board 11s or a circuit board 12s, as described above. The circuit board 17 may also function as a circuit for supplying power or driving signals to the light sources 18a and a light source 18b, which are described below.

In FIG. 2, the lens element 15 converges light from the detection target 3. The lens element 15 is an imaging optical lens. The sensor element 16 receives the light converged by the lens element 15. According to the embodiments of the disclosure, the lens element 15 includes a rod lens array in which rod lenses are arranged in the arrangement direction. In addition, the sensor element 16 includes a multi-chip sensor in which sensors are arranged in the arrangement direction. The arrangement direction thus corresponds to the main scanning direction in the image reading apparatus 40. The transport direction corresponds to the sub-scanning direction in the image reading apparatus 40. Furthermore, the electric field direction corresponds to the optical axis direction of the lens element 15 (image reader 14). Accordingly, the main surface of at least one of the first substrate 11 or the second substrate 12 of the electrostatic capacitance detection device 20 is disposed in parallel to the optical axis of the image reader 14. The optical axis of the image reader 14 (lens element 15) is parallel to the direction (Z-axis direction) orthogonal to the transport direction.

The lens element 15 may also include a micro lens array other than the rod lens array. The lens element 15 may also be a lens element for image reading in a reduction optical system, for example, other than the lens element in an erecting equal-magnification optical system, such as the element including the rod lens array or micro lens array. Alternatively, the lens element 15 may be an image sensor.

In the case of the lens element 15 in the erecting equal-magnification optical system, the lens element 15 is disposed along the long side or short side of the detection target 3. The lens element 15 thus has a length in the main scanning direction that is at least the length of the long side or short side of the detection target 3, like the first electrode 1 and the second electrode 2. Similarly, in the case of the sensor element 16 made of a multi-chip sensor, the sensor element 16 is disposed along the long side or short side of the detection target 3. The sensor element 16 thus has a length in the main scanning direction that is at least the length of the long side or short side of the detection target 3, like the first electrode 1 and the second electrode 2.

In FIG. 2, the circuit board 17 is a substrate provided with the sensor element 16. The circuit board 17 photoelectrically converts the light received at the sensor element 16. The circuit board 17 may function as a signal processing board for processing the signals after photoelectric conversion. The circuit board 17 functioning as the signal processing board may be provided separately from the substrate provided with the sensor element 16. Each of the light sources 18a serving as a reflected light source includes a light guide extending in the main scanning direction. The light guides of the light sources 18a have a length in the main scanning direction that is at least the length of the long side or short side of the detection target 3. The light sources 18a irradiate the detection target 3 with linear light in the main scanning direction. The housing 13c is provided with a cover glass 7 on the side of the transport path 5. The cover glass 7 may also be made of a transparent resin, such as polycarbonate or acrylic resin, other than glass.

The cover glass 7 thus is also called the cover member 7 in some contexts. As indicated by the broken-line arrows in FIG. 2, the light emitted from the light sources 18a passes through the cover member 7 and arrives at the detection target 3. As indicated by the broken-line arrow extending in the optical axis direction in FIG. 2, the emitted light is reflected by the detection target 3, passes through the cover member 7, and is received at the sensor element 16 via the lens element 15. Based on the received reflected light, the image reading apparatus 40 can obtain an image of the detection target 3.

Because of the electrostatic capacitance detection device 20 having a small dimension in the sub-scanning direction, the image reading apparatus 40 according to Embodiment 1 can readily achieve a reduction in the whole size. The cost can be reduced when at least one of the first flat plate 6 or the second flat plate 7 of the electrostatic capacitance detection device 20 according to Embodiment 1 is made of the same material as the cover member 7. At least one of the first flat plate 6 or the second flat plate 7 thus has a transmittance of the light emitted from the light sources 18a that is equal to or greater than a threshold value. This threshold value is determined depending on the amount of light emitted from the light sources 18a, for example.

Furthermore, in order to simplify the configuration of the first flat plate 6 or the second flat plate 7 made of the same material as the cover member 7, the first electrode 1 or the second electrode 2 may be a transparent electrode. In other words, at least one pair of the first flat plate 6 and the first electrode 1, or the second flat plate 7 and the second electrode 2 thus has a transmittance of the light emitted from the light sources 18a that is equal to or greater than the threshold value. Alternatively, the first flat plate 6 and the second flat plate 7 may be made of a member having a transmittance equal to or greater than a first threshold value while the first electrode 1 and the second electrode 2 may be made of a member having a transmittance equal to or greater than a second threshold value. The first and second threshold values are determined depending on the amount of light emitted from the light sources 18a, for example. The first threshold value may be equal to or different from the second threshold value.

In other words, the first flat plate 6 and the second flat plate 7 are transparent plates made of the same member as the cover member 7. The first electrode 1 and the second electrode 2 are transparent electrodes provided on the transparent plates. An example of transparent electrode is an indium tin oxide (ITO) film. The ITO film can readily achieve integration of the transparent electrode and the transparent plate. The light emitted from the light sources 18a does not necessarily be visible light. The integration of the first electrode 1 and the first flat plate 6 and the integration of the second electrode 2 and the second flat plate 7 lead to a reduction in the thickness of the electrostatic capacitance detection device 20, regardless of the transmittances of the light emitted from the light sources 18a through the first electrode 1, the second electrode 2, the first flat plate 6, and the second flat plate 7.

The image reading apparatus 40 is equipped with the electrostatic capacitance detection device 20. In the example according to Embodiment 1, the first electrode 1 and the second electrode 2 in the electrostatic capacitance detection device 20 are located at positions upstream or downstream of the image readers 14 included in the image reading apparatus 40 in the transport direction within the transport path 5. A piece of transparent resin tape adhering to the detection target 3 as a foreign object rarely appears in an image, such as reflected-light image or transmitted-light image, because the piece of resin tape is transparent against transmitted light and reflected light. The detection target 3 with a piece of transparent resin tape thus can be effectively identified by means of a combination of electrostatic capacitance detection and image reading (optical reading). Since the electrostatic capacitance detection device 20 for electrostatic capacitance detection and the image readers 14 for image reading are arranged in the transport direction in the image reading apparatus 40 according to Embodiment 1, this pair of modules is able to acquire an electrostatic capacitance image and an optical image of the detection target 3.

The image reading apparatus 40 according to Embodiment 1 is described in more detail. The housings 13a and 13b accommodate at least one of the oscillation circuit or the detection circuit therein. The sensor element 16 included in each image reader 14 is installed inside the housing 13c closed by at least one of the first flat plate 6 or the second flat plate 7. The image readers 14 read images (image data) of the detection target 3.

A configuration of the electrostatic capacitance detection device 21 in the image reading apparatus 40 is described, which is more preferable in the case where an image, watermark, or the like printed on the detection target 3 is detected by a device or sensor for detecting information other than the change in electrostatic capacitance caused by the detection target 3. The first flat plate 6 and the second flat plate 7 are transparent plates, which are applicable to the cover member 7 for sealing the housing 13c. The first electrode 1 and the second electrode 2 are transparent electrodes provided on the cover member 7. The second flat plate 7 has a transmittance of the light emitted from the light sources 18a that is equal to or greater than the threshold value. In FIG. 2, the first electrode 1 does not necessarily be transparent. The first flat plate 6 does not necessarily be transparent provided that the shielding of the light from the below-described light sources 18a and 18b by the first electrode 1 does not interfere with the reading operation of the below-described image readers 14. The light emitted from the light sources 18a and 18b does not necessarily be visible light.

In FIG. 2, each of the image readers 14 includes at least the sensor element 16. The lens element 15 converges the light reflected by the detection target 3 or the light transmitted through the detection target 3 via at least one of the first flat plate 6 or the second flat plate 7. The sensor element 16 receives the light converged by the lens element 15. The light sources 18a and 18b emit light to the detection target 3. The light to be converged by the lens element 15 is the light emitted from the light sources 18a to the detection target 3 and reflected by the detection target 3, or the light emitted from the light source 18b to the detection target 3 and transmitted through the detection target 3. The light sources 18a and 18b are disposed on the side of the first flat plate 6 or the second flat plate 7 opposite to the transport path 5. That is, the light sources 18a and 18b are included in any of the housings 13a, 13b, and 13c.

This configuration enables the image reading apparatus 40 illustrated in FIG. 2 to read images of both of the front surface of the detection target 3, that is, the surface opposed to the housing 13b, and the rear surface of the detection target 3, that is, the surface opposed to the housing 13a. As indicated by the broken-line arrows inclined from the optical axis direction in FIG. 2, the detection target 3 is irradiated with the light from the light sources 18a. As indicated by a broken-line arrow extending in the optical axis direction, the irradiated light is reflected by the detection target 3 and transmitted through the first flat plate 6 or the second flat plate 7, which is the cover glass. The reflected light is then received via the lens element 15 by the sensor element 16. As indicated by another broken-line arrow extending in the optical axis direction, another irradiated light is transmitted through the detection target 3 and then transmitted through the first flat plate 6 or the second flat plate 7. The transmitted light is then received via the lens element 15 by the sensor element 16. The light source 18b is a transmitted light source. The light source 18b includes a light guide extending in the main scanning direction. The light guide of the light source 18b has a length in the main scanning direction that is at least the length of the long side or short side of the detection target 3.

The first substrate 11 of the electrostatic capacitance detection device 20 (image reading apparatus 40) illustrated in FIG. 1 (FIG. 2) has a first end portion, which is formed by bending and is in direct or indirect contact with the first flat plate 6. Alternatively, the first substrate 11 has a first end portion, which is formed by bending and is opposed to the first flat plate 6. That is, the portion of the first substrate 11 that is in direct or indirect contact with the first flat plate 6 is provided with the first electrode 1. Alternatively, the portion of the first substrate 11 that is opposed to the first flat plate 6 is provided with the first electrode 1. In addition, the first substrate 11 has a second end portion opposite to the first end portion, which is formed by bending and in which the first substrate 11 is electrically connected to the circuit board 11s (circuit board 17). For example, a connector 17c mounted on the circuit board 17 is electrically connected to the second end portion of the first substrate 11. Needless to mention, the second end portion of the first substrate 11 may be fixed to the circuit board 11s (circuit board 17) by soldering, for example. In other words, the first substrate 11 has the main surface located between the first end portion and the second end portion. The main surface of the first substrate 11 is not the portion provided with the first electrode 1 and extends in the electric field direction in which at least parts of the first electrode 1 and the second electrode 2 are opposed to each other.

The second substrate 12 of the image reading apparatus 40 has a first end portion, which is formed by bending and is in direct or indirect contact with the second flat plate 7. Alternatively, the second substrate 12 has a first end portion, which is formed by bending and is opposed to the second flat plate 7. That is, the portion of the second substrate 12 that is in direct or indirect contact with the second flat plate 7 is provided with the second electrode 2. Alternatively, the portion of the second substrate 12 that is opposed to the second flat plate 7 is provided with the second electrode 2. In addition, the second substrate 12 has a second end portion opposite to the first end portion, which is formed by bending and in which the second substrate 12 is electrically connected to the circuit board 12s (circuit board 17). For example, the connector 17c mounted on the circuit board 17 is electrically connected to the second end portion of the second substrate 12. Needless to mention, the second end portion of the second substrate 12 may be fixed to the circuit board 12s (circuit board 17) by soldering, for example. In other words, the second substrate 12 has the main surface located between the first end portion and the second end portion. The main surface of the second substrate 12 is not the portion provided with the second electrode 2 and extends in the electric field direction in which at least parts of the first electrode 1 and the second electrode 2 are opposed to each other.

In the image reading apparatus 40 illustrated in FIG. 2, each of the main surfaces of the first substrate 11 and the second substrate 12 is disposed in parallel to the direction (Z-axis direction) orthogonal to the transport direction. The first substrate 11 and the second substrate 12 are deviated from each other in the transport direction. In the image reading apparatus 40 illustrated in FIG. 2, at least one of the first substrate 11 or the second substrate 12 may serve as a shading member for shading the light emitted from the light sources 18a and 18b. The first electrode 1 and the second electrode 2 may also serve as a shading member like the first substrate 11 and the second substrate 12 in FIG. 2. In this case, the first flat plate 6 and the second flat plate 7 does not necessarily be transparent at the positions corresponding to the first electrode 1 and the second electrode 2. In other words, instead of the first electrode 1 and the second electrode 2, the first flat plate 6 and the second flat plate 7 may be colored at the positions corresponding to the first electrode 1 and the second electrode 2.

In detail, at least one of the first substrate 11 or the second substrate 12 (including at least one of the first electrode 1 or the second electrode 2) may prevent the second reading position 142 from being irradiated with the light from a first light source (light source 18a adjacent to the first substrate 11) in the image reading apparatus 40 illustrated in FIG. 2.

Also, at least one of the first substrate 11 or the second substrate 12 (including at least one of the first electrode 1 or the second electrode 2) may prevent the first reading position 141 from being irradiated with the light from a second light source (light source 18a adjacent to the second substrate 12).

Figure 3:
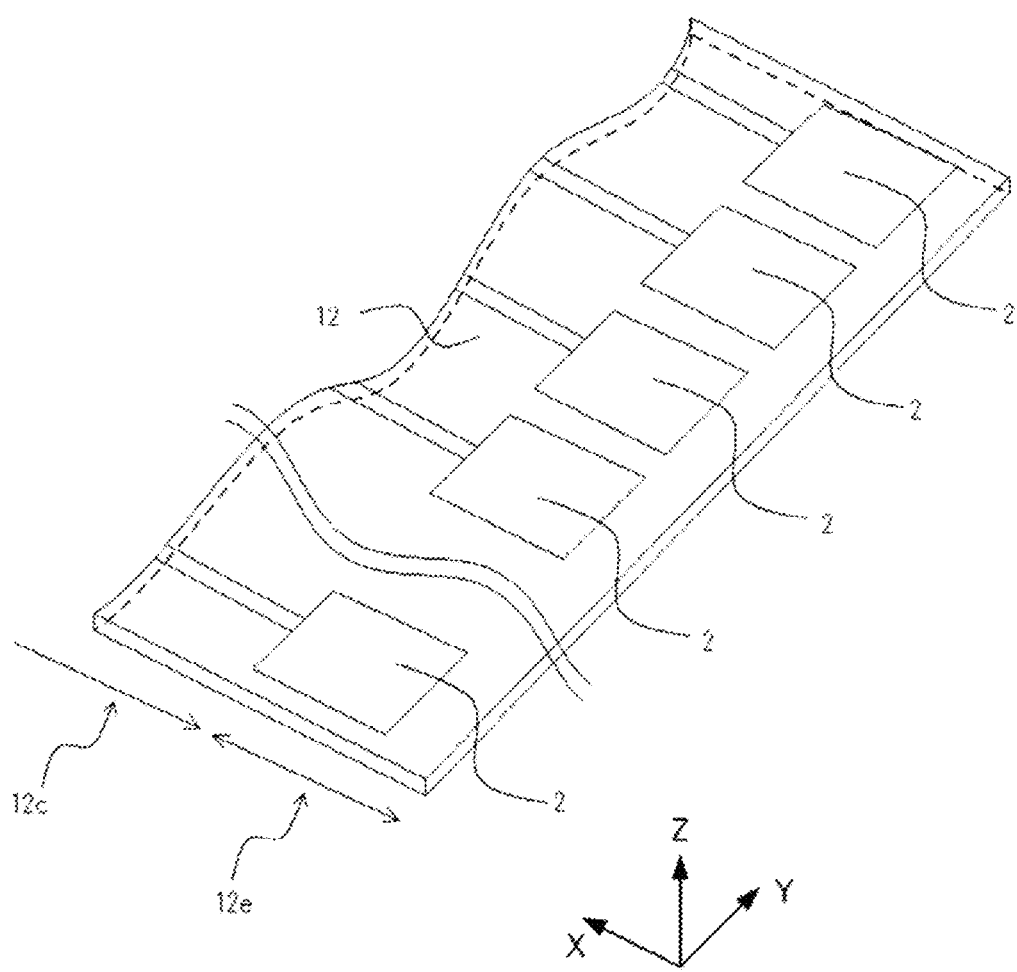
FIG. 3 is a perspective view of an important part including an electrode of the image reading apparatus (electrostatic capacitance detection device) according to Embodiment 1.
Figure 4:
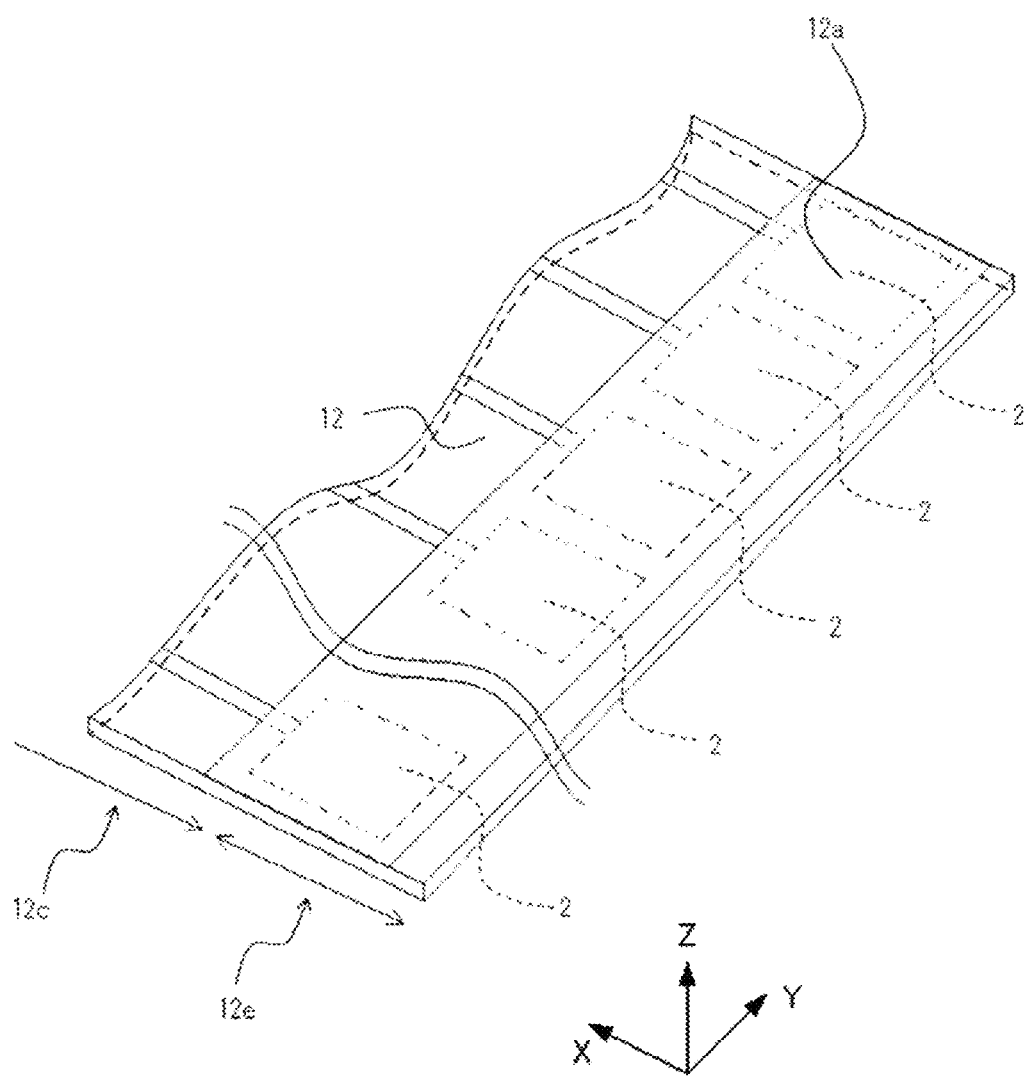
FIG. 4 is a perspective view of the important part including the electrode of the image reading apparatus (electrostatic capacitance detection device) according to Embodiment 1.
Figure 5:
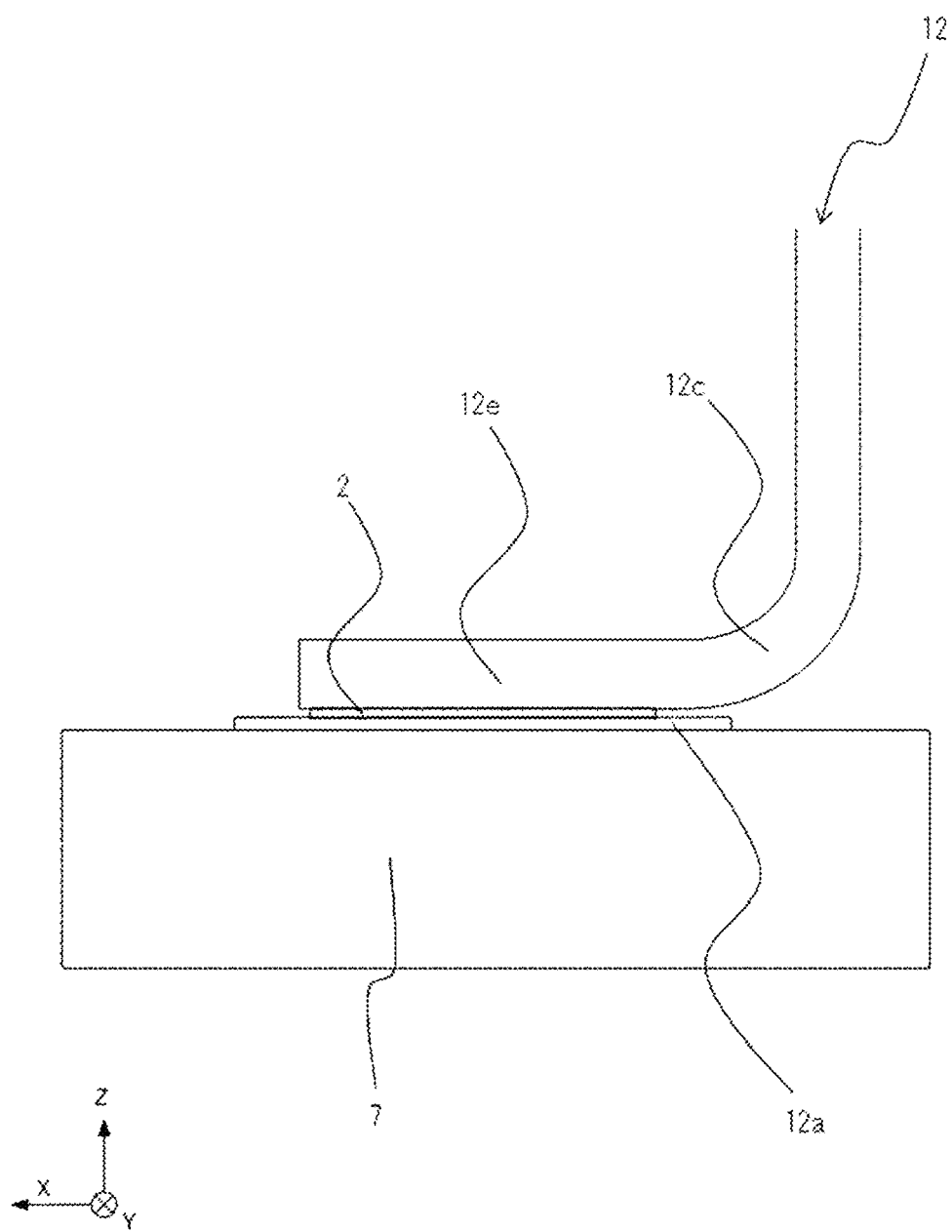
FIG. 5 is a diagram for describing the connection in the important part including the electrode of the image reading apparatus (electrostatic capacitance detection device) according to Embodiment 1.

The second substrate 12 is described in more detail with reference to FIGS. 3, 4, and 5. Since the first substrate 11 and the second substrate 12 have the identical configuration (although the first electrode 1 and the second electrode 2 may have mutually different configurations), the description of the first substrate 11 is replaced with the parenthesized terms. As illustrated in FIG. 3, the first end portion of the second substrate 12 (first substrate 11) includes a bent segment 12c (bent segment 11c) and an electrode segment 12e (electrode segment 11e). The electrode segment 12e (electrode segment 11e) is provided with a plurality of conductive patterns of the second electrode 2 (first electrode 1) arranged in the arrangement direction. The conductive patterns of the second electrode 2 (first electrode 1) are connected to individual leader lines (leader patterns). The bent segment 12c (bent segment 11c) of the second substrate 12 (first substrate 11) is bent such that the conductive patterns of the second electrode 2 (first electrode 1) are in contact with the second flat plate 7 (first flat plate 6). The second electrode 2 (first electrode 1) illustrated in FIGS. 3, 4, and 5 may also include an integrated conductive pattern continuous in the arrangement direction (cross direction), as mentioned above. That is, the first electrode 1 (second electrode 2) may include a conductive pattern continuous in the cross direction, or conductive patterns discontinuous in the cross direction.

In the electrostatic capacitance detection device 20 (image reading apparatus 40) according to Embodiment 1, an exemplary case where the first substrate 11 and the first flat plate 6 have different linear expansion coefficients or an exemplary case where the second substrate 12 and the second flat plate 7 have different linear expansion coefficients is described with reference to FIG. 5. For example, when the first substrate 11 and the first flat plate 6, which is made of the same member as the above-described cover member 7, have significantly different linear expansion coefficients, this difference in linear expansion coefficients must be considered. The same holds true for the case where the second substrate 12 and the second flat plate 7 have significantly different linear expansion coefficients.

In this case, in order to maintain the electrical connection between the first substrate 11 and the first electrode 1 provided on the first substrate 11, a conductive cushioning member is disposed between the first electrode 1 and the first substrate 11 and thereby achieve the connection therebetween. Also, in order to maintain the electrical connection between the second substrate 12 and the second electrode 2 provided on the second substrate 12, a conductive cushioning member is disposed between the second electrode 2 and the second substrate 12 and thereby achieve the connection therebetween. FIG. 5 illustrates a configuration of the electrostatic capacitance detection device 20 on the side of the housing 13b, in which a cushioning member 12a is applied to connect the second electrode 2 to the second substrate 12. The electrostatic capacitance detection device 20 has a similar configuration on the side of the housing 13a. Materials that are to be selected as the cushioning member include conductive elastic materials, such as conductive rubbers, that can absorb shocks. Instead of the conductive rubbers, a pin connecter, such as shock absorbing spring made of a phosphor bronze plate, may be selected as the cushioning member.

As illustrated in FIG. 2, the housing 13a has a large space for accommodating the first substrate 11 and can thus accommodate other components. Furthermore, the large space for accommodating the first substrate 11 in the housing 13a can extend the possible range of the angle of the bent segment 11c. Also, as illustrated in FIG. 2, the housing 13b has a large space for accommodating the second substrate 12 and can thus accommodate other components. Furthermore, the large space for accommodating the second substrate 12 in the housing 13b can extend the possible range of the angle of the bent segment 12c.

The side surface (first end portion) of the first substrate 11 is opposed to the first flat plate 6 in the electric field direction. Also, the side surface (first end portion) of the second substrate 12 is opposed to the second flat plate 7 in the electric field direction. Each of the first substrate 11 and the second substrate 12 has a thin plate shape, that is, includes a side surface extending in the transport direction shorter than the length of the main surface extending in in the electric field direction. The second electrode 2 (first electrode 1) may be fixed to the second flat plate 7 (first flat plate 6) by being urged. The second electrode 2 (first electrode 1) can be more firmly fixed to the second flat plate 7 (first flat plate 6) by mounting a non-conductive adhesive layer 12a (adhesive layer 11a) on the second electrode 2 (first electrode 1), as illustrated in FIGS. 4 and 5. Although the adhesive layer 12a (adhesive layer 11a) encompasses the above-mentioned cushioning member 12a (cushioning member 11a) in this example, the adhesive layer 12a (adhesive layer 11a) may be a member different from the cushioning member 12a (cushioning member 11a). Preferable examples of the adhesive layer 12a (adhesive layer 11a) include a piece of non-conductive double-sided tape and a non-conductive adhesive. This non-conductive adhesive layer 12a (adhesive layer 11a) may be provided across the conductive patterns of the second electrode 2 (first electrode 1).

As described above, the first substrate 11 has an end portion (first end portion) formed by bending and is in direct or indirect contact with the first flat plate 6. Also, the second substrate 12 has an end portion (first end portion) formed by bending and is in direct or indirect contact with the second flat plate 7. The first substrate 11 and the second substrate 12 does not necessarily be in direct or indirect contact with the first flat plate 6 and the second flat plate 7, respectively, and may independently maintain the own shapes or may be retained by other members. That is, the first substrate 11 may have an end portion (first end portion) formed by bending and opposed to the first flat plate 6. Also, the second substrate 12 (first end portion) may have an end portion formed by bending and opposed to the second flat plate 7. The first substrate 11 and the second substrate 12 having this modified configurations may be provided in combination, and the first substrate 11 and the second substrate 12 having the original configurations may be provided in combination.

Figure 6A:
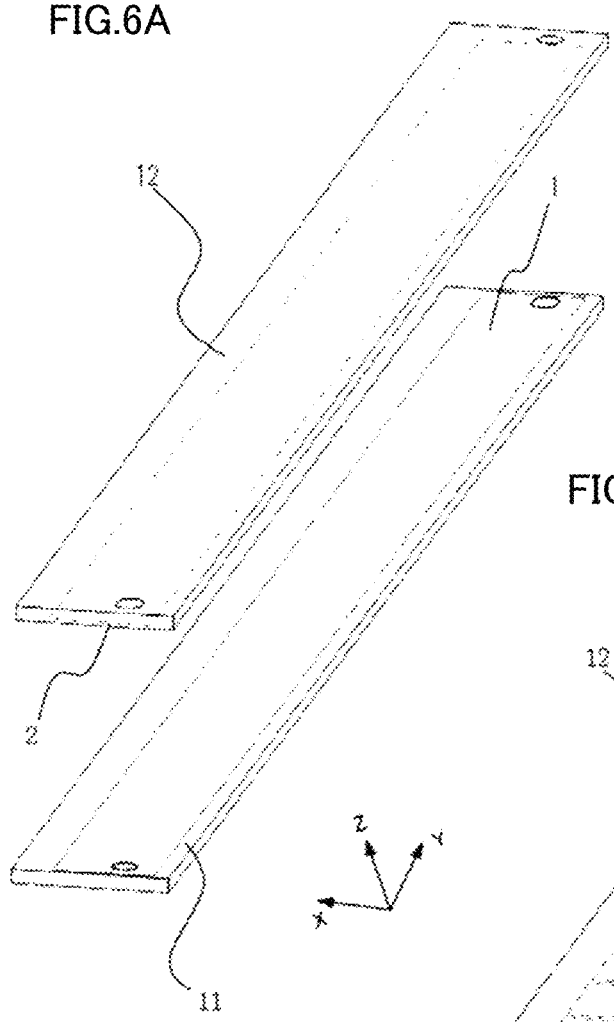
FIG. 6 is a perspective view of important parts including electrodes of an electrostatic capacitance detection device in a comparative example to be compared with the image reading apparatus (electrostatic capacitance detection device) according to Embodiment 1.

The specific configuration of an electrode of the electrostatic capacitance detection device 20 (image reading apparatus 40) according to Embodiment 1 is described with reference to FIGS. 6 to 17. FIG. 6 is a perspective view of important parts including electrodes of an electrostatic capacitance detection device in a comparative example. In the section (A) of FIG. 6, the first electrode 1 and the second electrode 2 have the identical shape and each include a conductive pattern continuous in the cross direction (main scanning direction). In the section (B) of FIG. 6, the first electrode 1 and the second electrode 2 have the identical shape and each include discontinuous conductive patterns extending in the cross direction (main scanning direction). FIGS. 11 and 13 to 17 illustrate the first floating electrode if provided on a plane different from the plane provided with the first electrode 1 among the planes defined by the X and Y axes. In detail, the first floating electrode if is disposed on the side of the first electrode 1 opposite to the transport path 5. The configuration equipped with the first floating electrode if and the second floating electrode 2f is called an electrostatic capacitance detection device 20 (image reading apparatus 40) according to a modification of Embodiment 1. The second floating electrode 2f is provided on a plane different from the plane provided with the second electrode 2 among the planes defined by the X and Y axes. In detail, the second floating electrode 2f is disposed on the side of the second electrode 2 opposite to the transport path 5.

In the electrostatic capacitance detection device 20 (image reading apparatus 40) according to Embodiment 1, the first electrode 1 and the second electrode 2 extend in the cross direction (main scanning direction) intersecting the transport direction and have mutually different shapes. This configuration can improve the stability of electric field in comparison to that in the comparative example illustrated in FIG. 6. As illustrated in FIGS. 7 to 10, the first electrode 1 and the second electrode 2 have only to have mutually different shapes in at least one of the transport direction or the cross direction. In addition to the difference in shapes, such as the difference between a single continuous conductive pattern and discontinuous conductive patterns, one of the first electrode 1 and the second electrode 2 may have a length shorter than the length of the other in the transport direction. Also, one of the first electrode 1 and the second electrode 2 may have a length shorter than the length of the other in the cross direction. The electrostatic capacitance detection device 20 (image reading apparatus 40) according to Embodiment 1 may include any combination of these three differences.

Figure 7:
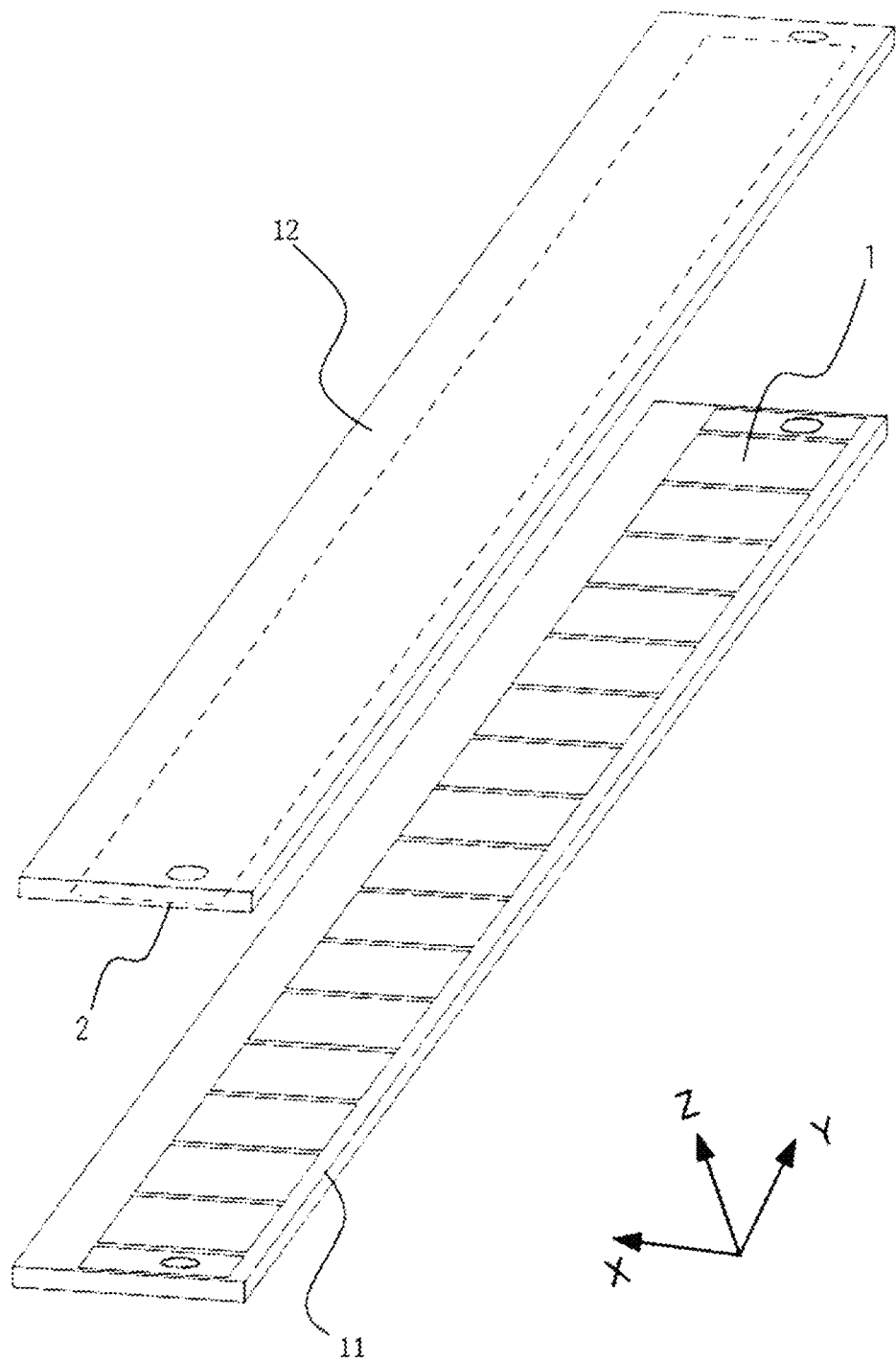
FIG. 7 is a perspective view of the important parts including the electrodes of the image reading apparatus (electrostatic capacitance detection device) according to Embodiment 1.

The first electrode 1 and the second electrode 2 illustrated in FIG. 7 have the same length in the transport direction. The first electrode 1 includes discontinuous conductive patterns mounted on the first substrate 11, and the second electrode 2 includes a single continuous conductive pattern mounted on the second substrate 12. That is, the first electrode 1 and the second electrode 2 extend in the cross direction (main scanning direction) intersecting the transport direction and have mutually different shapes. In detail, the first electrode 1 and the second electrode 2 have mutually different shapes in the cross direction.

The electrodes in the comparative example illustrated in FIG. 6 have the identical shape and the same number of conductive patterns depending on the resolution (number of samples) to be read. When these electrodes have mutually different shapes, the configuration can bring about the advantageous effects as follows. Specifically, in the example illustrated in FIG. 7, the second electrode 2 serving as the transmitting electrode includes an integrated conductive pattern. This configuration can reduce the variation in outputs from the individual pixels caused by the second electrode 2 serving as the transmitting electrode. The configuration can also stabilize the electric field distribution in the main scanning direction, resulting in a more uniform electric field strength distribution between the electrodes than that in the comparative example.

Figure 8:
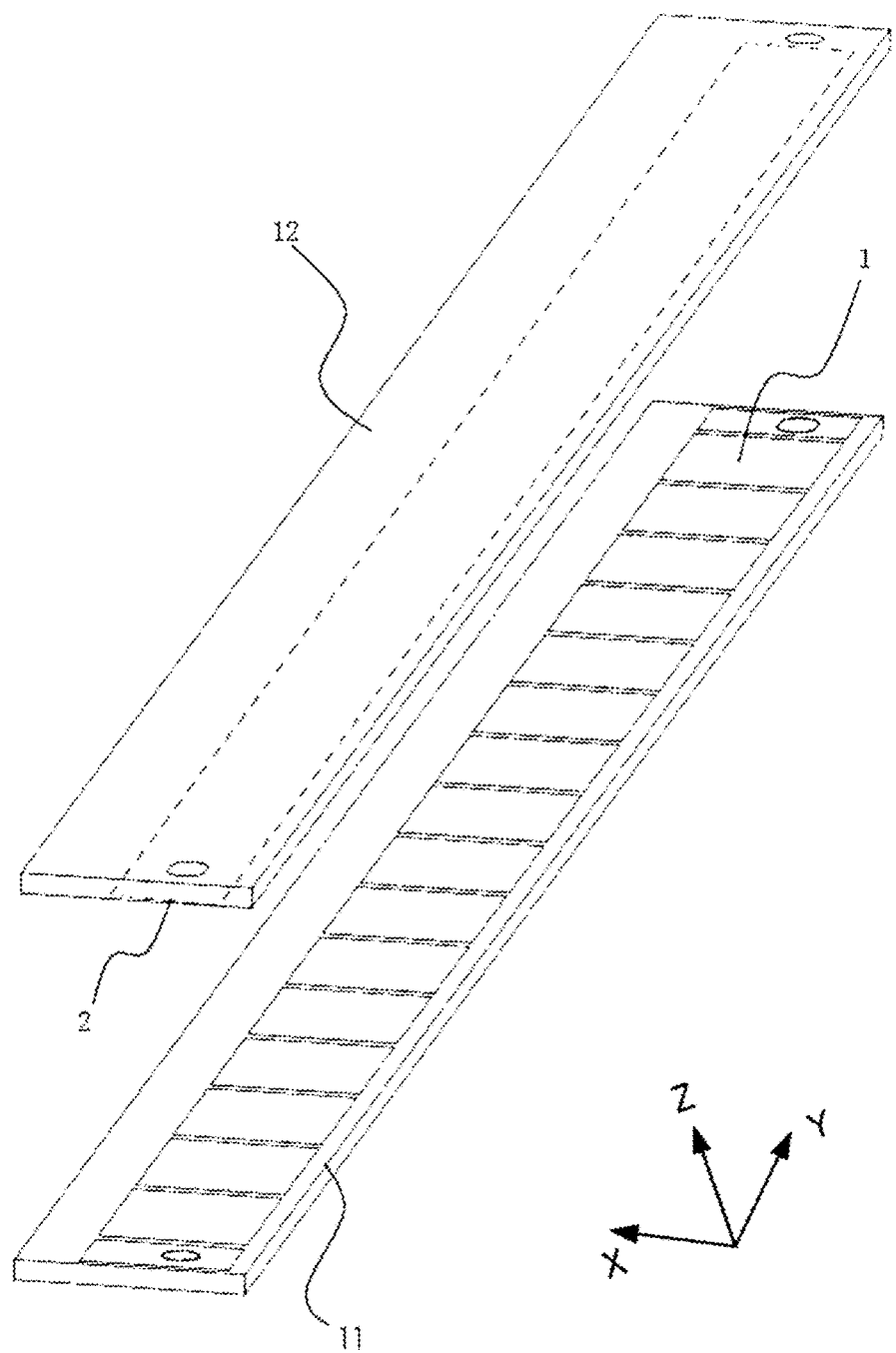
FIG. 8 is a perspective view of the important parts including the electrodes of the image reading apparatus (electrostatic capacitance detection device) according to Embodiment 1.

The first electrode 1 and the second electrode 2 illustrated in FIG. 8 have mutually different lengths in the transport direction. Specifically, the first electrode 1 is longer than the second electrode 2 in the transport direction. The first electrode 1 includes discontinuous conductive patterns provided on the first substrate 11, and the second electrode 2 includes a single continuous conductive pattern provided on the second substrate 12. That is, the first electrode 1 and the second electrode 2 extend in the cross direction (main scanning direction) intersecting the transport direction and have mutually different shapes. In detail, the first electrode 1 and the second electrode 2 have mutually different shapes in the cross direction, and one of the first electrode 1 and the second electrode 2 has a length shorter than the length of the other in the transport direction.

In the example illustrated in FIG. 8, the second electrode 2 serving as the transmitting electrode has a sub-scanning width (length in the transport direction) smaller (shorter) than the sub-scanning width (length in the transport direction) of the first electrode 1 serving as the receiving electrode, for the purpose of equalization of the electric field distribution between the electrodes. This configuration can equalize (stabilize) the electric field distribution between the electrodes, and obtain a more stable output than that in the comparative example regardless of a position of the detection target 3 between the electrodes. The example illustrated in FIG. 9 is configured by combining the examples illustrated in FIGS. 7 and 8.

Figure 9:
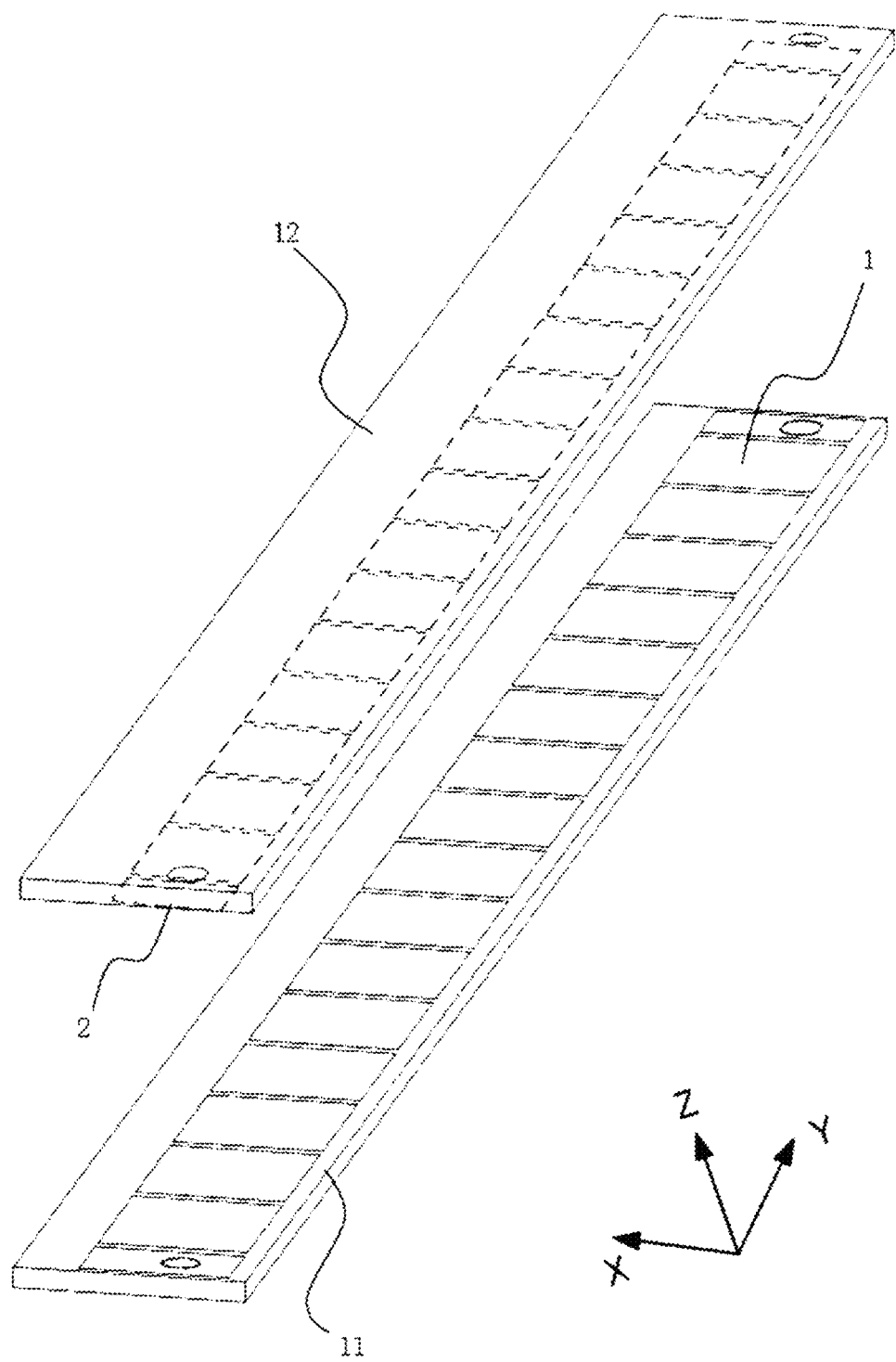
FIG. 9 is a perspective view of the important parts including the electrodes of the image reading apparatus (electrostatic capacitance detection device) according to Embodiment 1.

The first electrode 1 and the second electrode 2 illustrated in FIG. 9 have different lengths in the transport direction. Specifically, the first electrode 1 is longer than the second electrode 2 in the transport direction. The first electrode 1 and the second electrode 2 are respectively provided on the first substrate 11 and the second substrate 12, and include discontinuous conductive patterns. That is, the first electrode 1 and the second electrode 2 extend in the cross direction (main scanning direction) intersecting the transport direction and have mutually different shapes. In detail, the first electrode 1 and the second electrode 2 have mutually different shapes in the cross direction, and one of the first electrode 1 and the second electrode 2 has a length shorter than the length of the other in the transport direction. Although the numbers of the first electrode 1 and the second electrode 2 are identical in FIG. 9, different numbers of electrodes having mutually different lengths in the cross direction may be provided. These first electrode 1 and second electrode 2 are deemed to have mutually different shapes in the cross direction.

Figure 10:
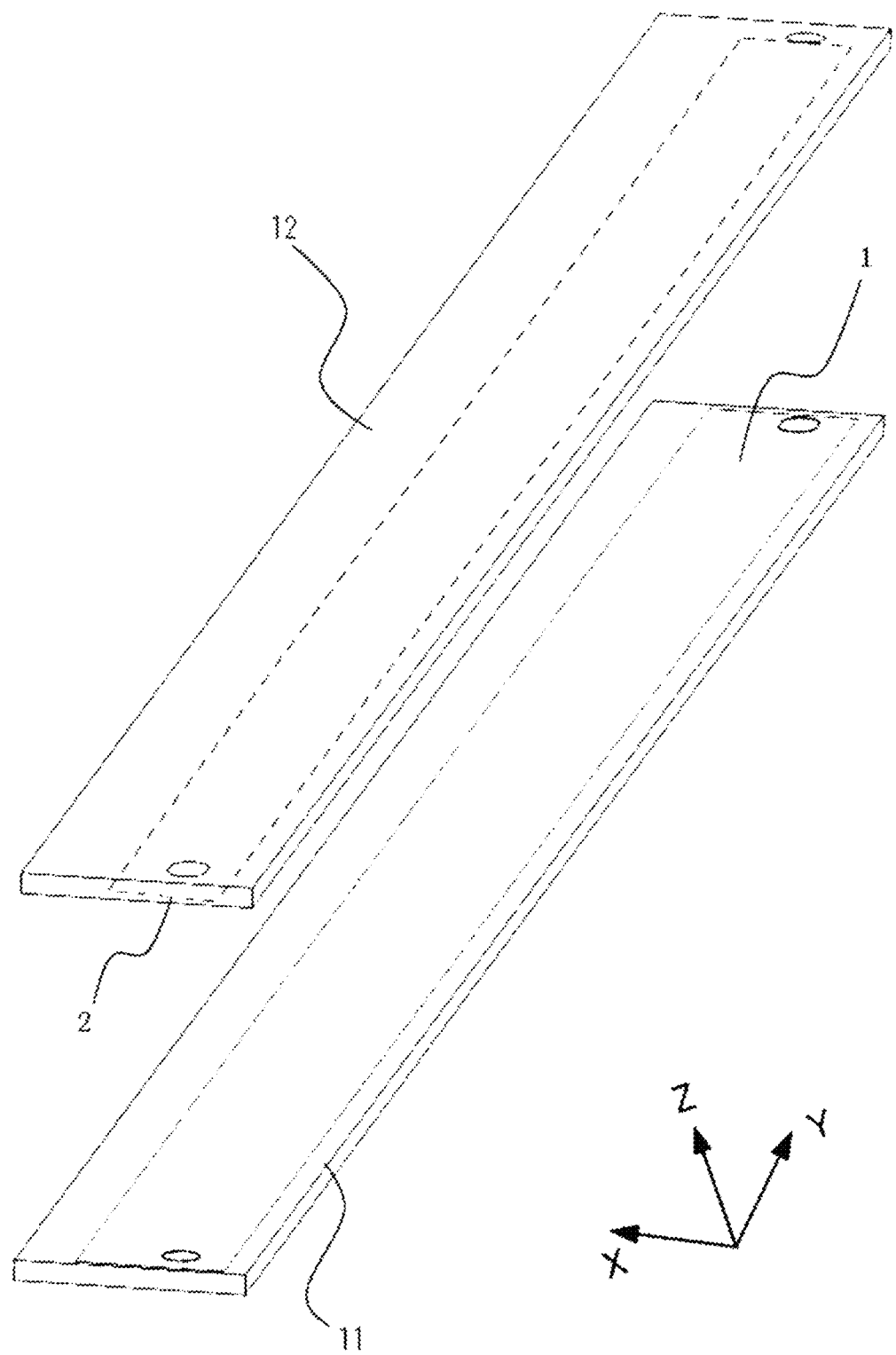
FIG. 10 is a perspective view of the important parts including the electrodes of the image reading apparatus (electrostatic capacitance detection device) according to Embodiment 1.

The first electrode 1 and the second electrode 2 illustrated in FIG. 10 have mutually different lengths in the transport direction. Specifically, the first electrode 1 is longer than the second electrode 2 in the transport direction. The first electrode 1 and the second electrode 2 are respectively provided on the first substrate 11 and the second substrate 12, and each include a single continuous conductive pattern. That is, the first electrode 1 and the second electrode 2 extend in the cross direction (main scanning direction) intersecting the transport direction and have mutually different shapes. The configuration illustrated in FIG. 9 is applied in a case in which the electrostatic capacitance detection device according to Embodiment 1 is used mainly as a point sensor.

As illustrated in FIGS. 8, 9, and 10, among the electrodes of the electrostatic capacitance detection device 20 (image reading apparatus 40) according to Embodiment 1, the second electrode 2 corresponding to the transmitting electrode has a length shorter than the length of the first electrode 1 corresponding to the receiving electrode in the transport direction.

Figure 11:
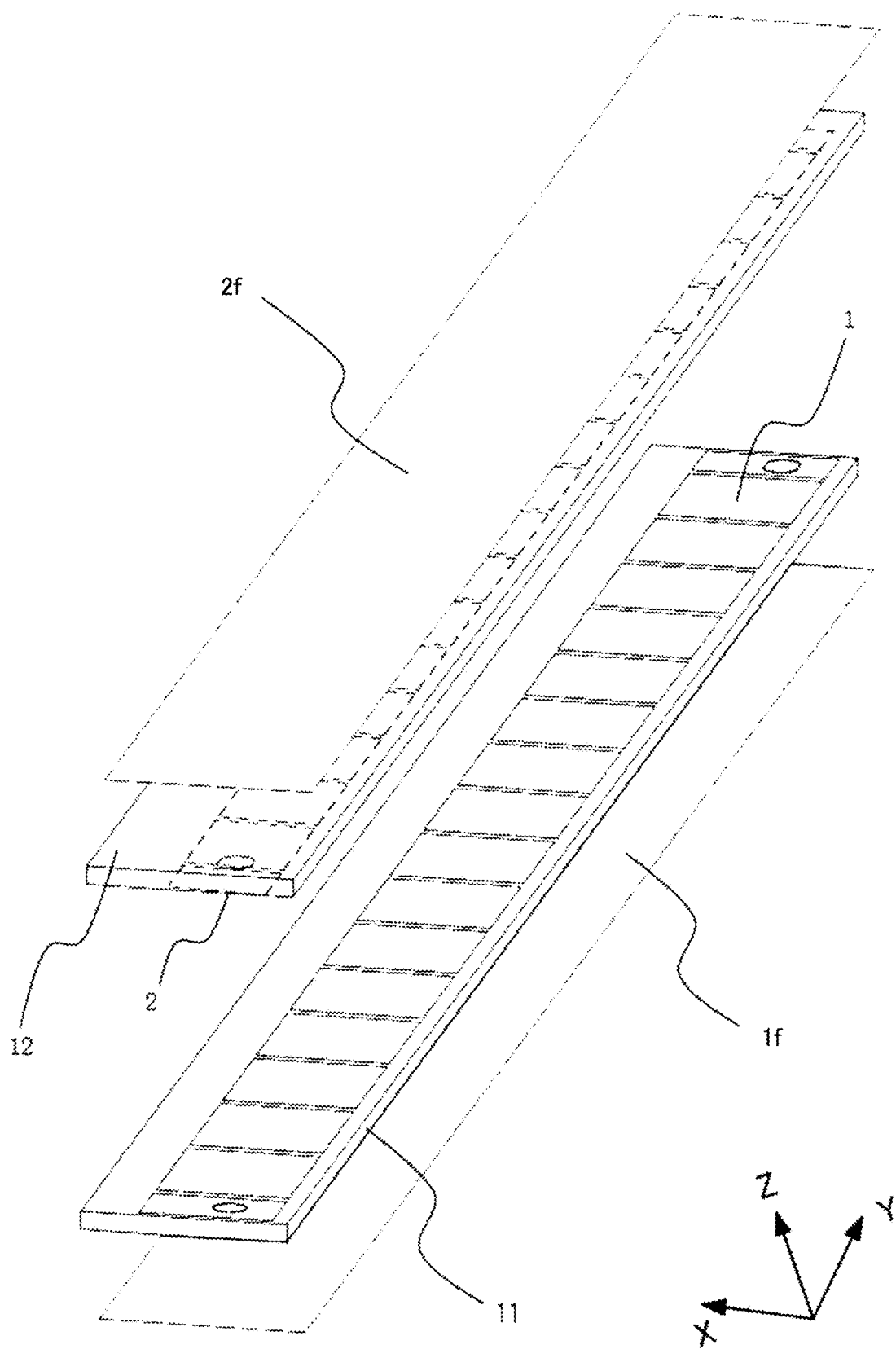
FIG. 11 is a perspective view of important parts including electrodes of an image reading apparatus (electrostatic capacitance detection device) according to a modification of Embodiment 1.

The first electrode 1 and the second electrode 2 illustrated in FIG. 11 are identical to the first electrode 1 and the second electrode 2 illustrated in FIG. 9, respectively. The configuration illustrated in FIG. 11 is further provided with the first floating electrode 1f and the second floating electrode 2f, which are electrically unstable floating electrodes, on the respective rear surfaces of the first electrode 1 serving as the receiving electrode and the second electrode 2 serving as the transmitting electrode, for the purpose of equalization of the electric field distribution between the electrodes. Because of the floating electrodes (first floating electrode 1f and second floating electrode 2f), the configuration can equalize (stabilize) the electric field distribution between the electrodes, and obtain a stable output regardless of a position of the detection target 3 between the electrodes. At least one of the first floating electrode 1f or the second floating electrode 2f may be supplied with an electric potential. The electric potential may be supplied in the form of direct current (DC) via a feeder line connected to the first floating electrode 1f, for example. The same holds true for the second floating electrode 2f. In other words, at least one of the first floating electrode 1f or the second floating electrode 2f may be connected to a feeder line and supplied with DC power. The figure does not illustrate a feeder line connected to the first floating electrode 1f or the second floating electrode 2f.

Figure 6B:
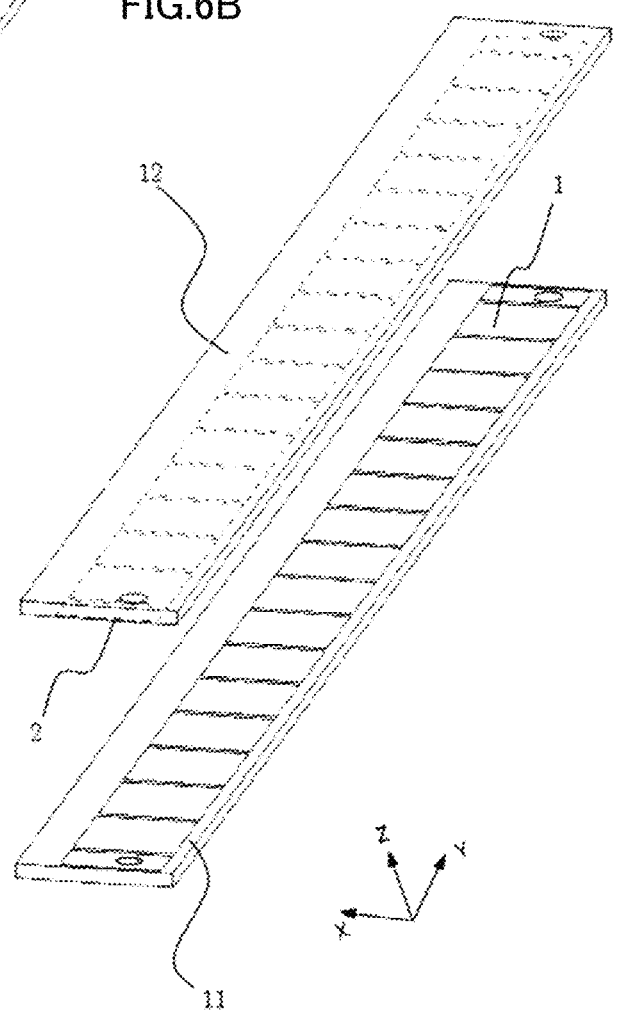
Figure 12:
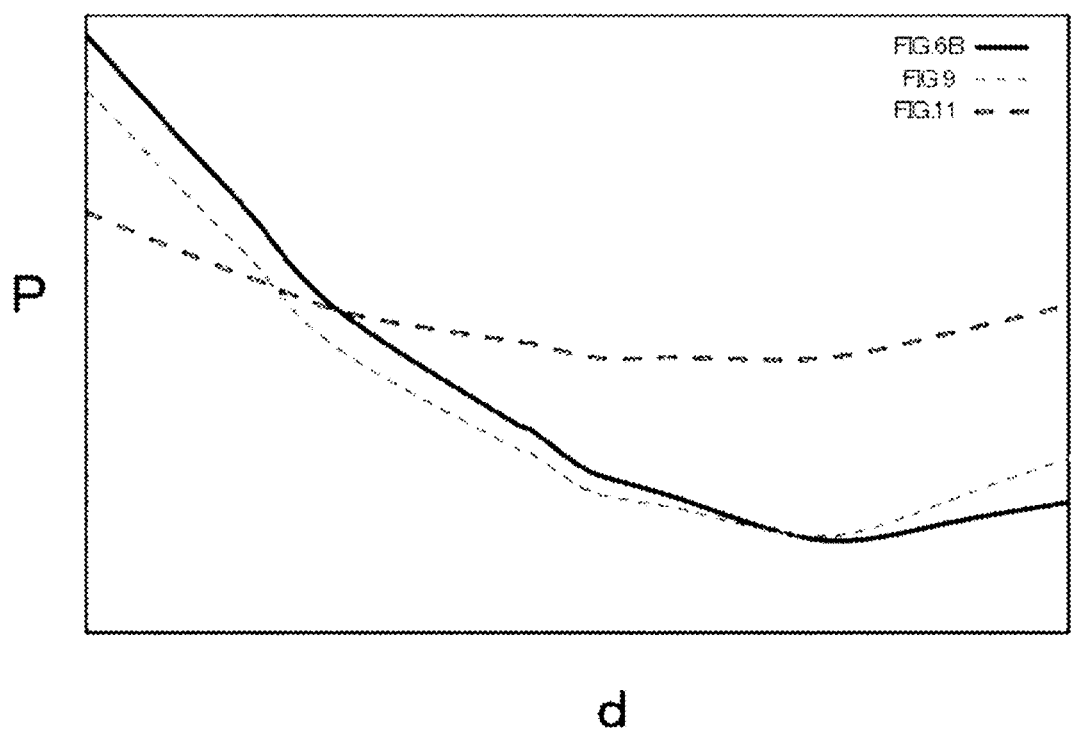
FIG. 12 is a graph illustrating electric field strength distributions at the individual positions between the electrodes in the image reading apparatus (electrostatic capacitance detection device) according to Embodiment 1 and the electrostatic capacitance detection device in the comparative example.

FIG. 12 is a graph illustrating electric field strength distributions at the individual positions between the electrodes in the electrostatic capacitance detection device 20 (image reading apparatus 40) and the electrostatic capacitance detection device in the comparative example. The vertical axis indicates an electric field strength distribution (P), and the horizontal axis indicates a gap d representing a position between the electrodes (first electrode 1 and second electrode 2). In FIG. 12, the solid line indicates data on the comparative example illustrated in the section (B) of FIG. 6 (FIG. 6B). The dashed line indicates data on the electrostatic capacitance detection device 20 illustrated in FIG. 9 (FIG. 9). The hollow dashed line indicates data on the electrostatic capacitance detection device 20 illustrated in FIG. 11 (FIG. 11).

That is, FIG. 12 illustrates a specific example (calculation result) in which the electric field strength distribution between the first electrode 1 and second electrode 2 is stabilized because of changes in the shapes of the electrodes (first electrode 1 and second electrode 2) in comparison to those in the comparative example. A change in the sizes of the first electrode 1 and the second electrode 2 in comparison to those in the comparative example leads to a reduction in variation in the electric field strength. The addition of the floating electrodes (first floating electrode 1f and second floating electrode 2f) further reduces the variation in the electric field strength, resulting in uniform properties.

Figure 13:
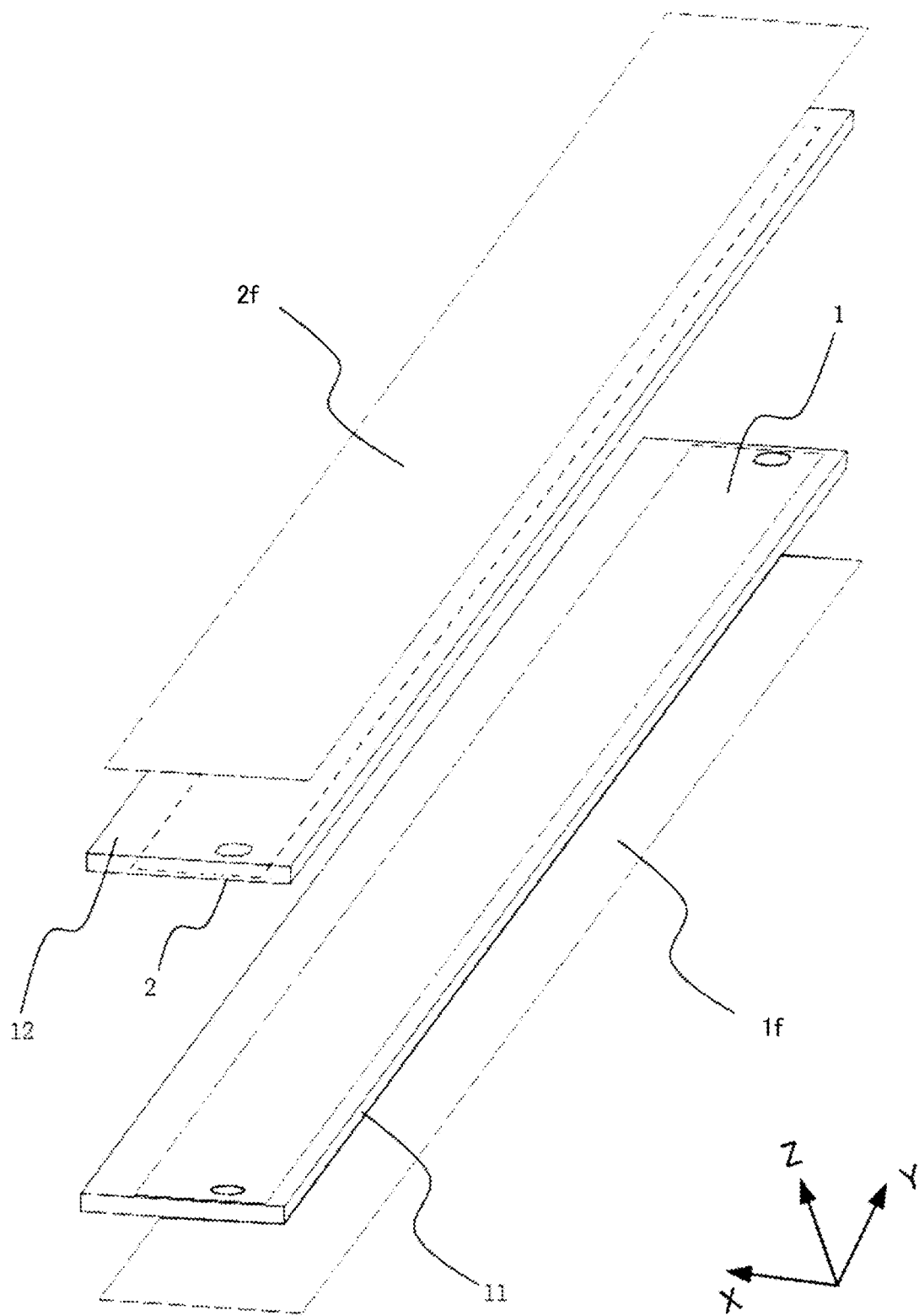
FIG. 13 is a perspective view of important parts including electrodes of an image reading apparatus (electrostatic capacitance detection device) according to the modification of Embodiment 1.
Figure 14:
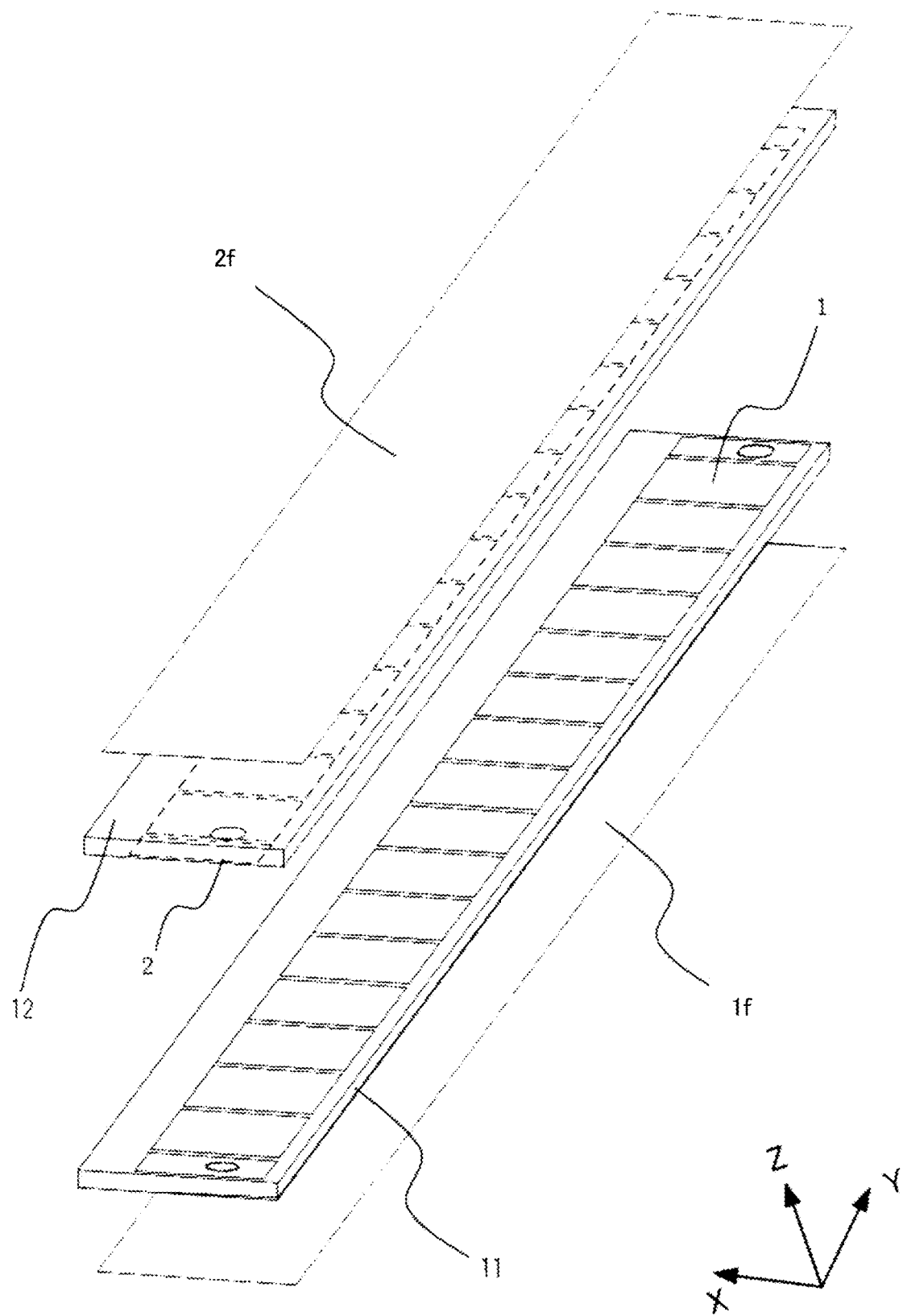
FIG. 14 is a perspective view of important parts including electrodes of an image reading apparatus (electrostatic capacitance detection device) according to the modification of Embodiment 1.

The electrostatic capacitance detection device 20 (image reading apparatus 40) according to Embodiment 1 including the first floating electrode 1f and the second floating electrode 2f can equalize (stabilize) the electric field distribution between the electrodes, even without any change in the shapes of the electrodes (first electrode 1 and second electrode 2) as illustrated in FIGS. 13 and 14.

As described above, the electrostatic capacitance detection device 20 (image reading apparatus 40) according to Embodiment 1 detects a change in electrostatic capacitance based on an electric field formed between the electrodes. The electrostatic capacitance detection device 20 includes: the first electrode 1 corresponding to one of the electrodes; the second electrode 2 corresponding to the other of the electrodes, at least a part of which is opposed to the first electrode 1 across the transport path 5 extending in the transport direction in which the detection target 3 having a sheet shape is transported; the first floating electrode 1f disposed on the side of the first electrode 1 opposite to the transport path 5; and the second floating electrode 2f disposed on the side of the second electrode 2 opposite to the transport path 5.

Figure 15:
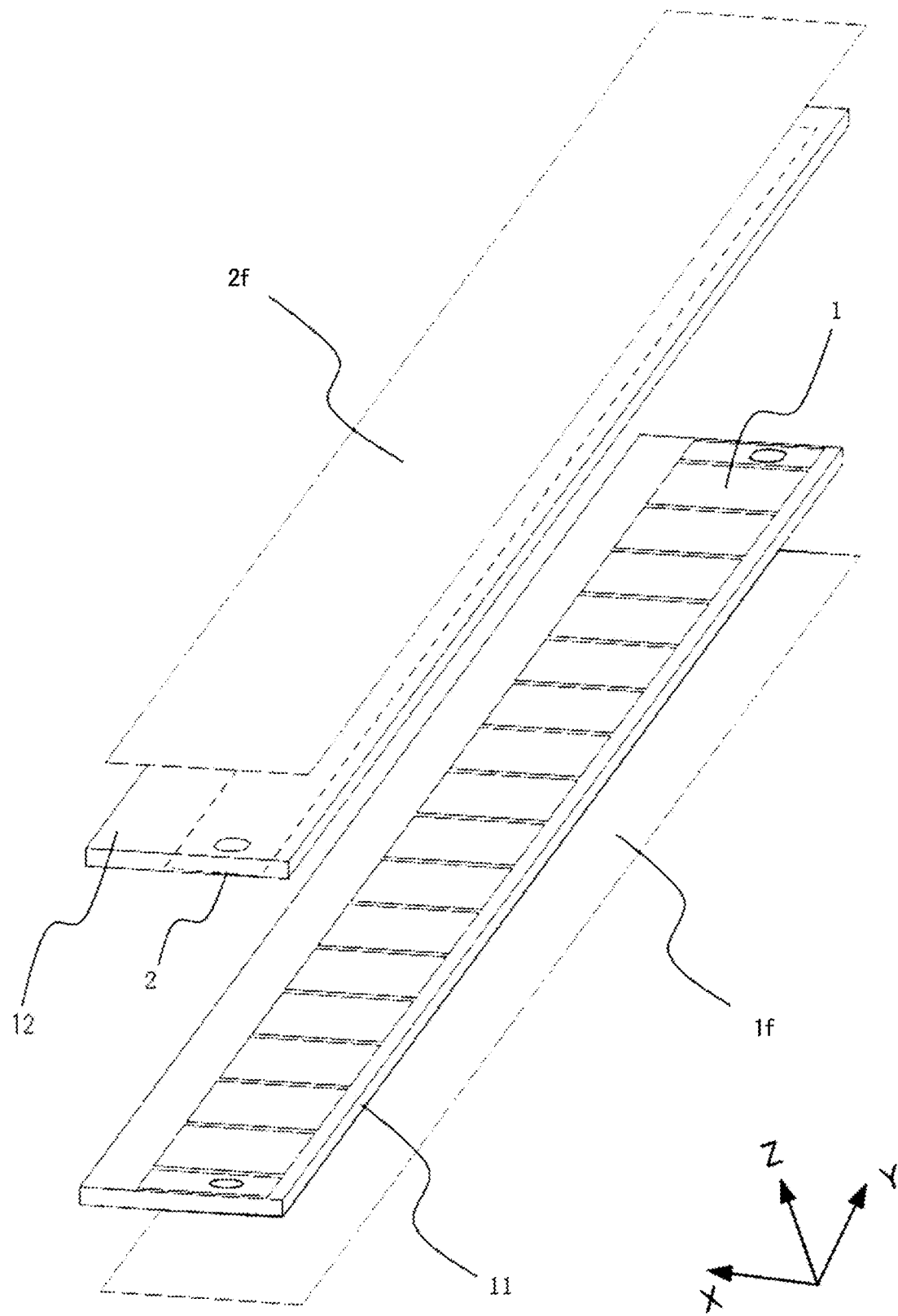
FIG. 15 is a perspective view of important parts including electrodes of an image reading apparatus (electrostatic capacitance detection device) according to the modification of Embodiment 1.
Figure 16:
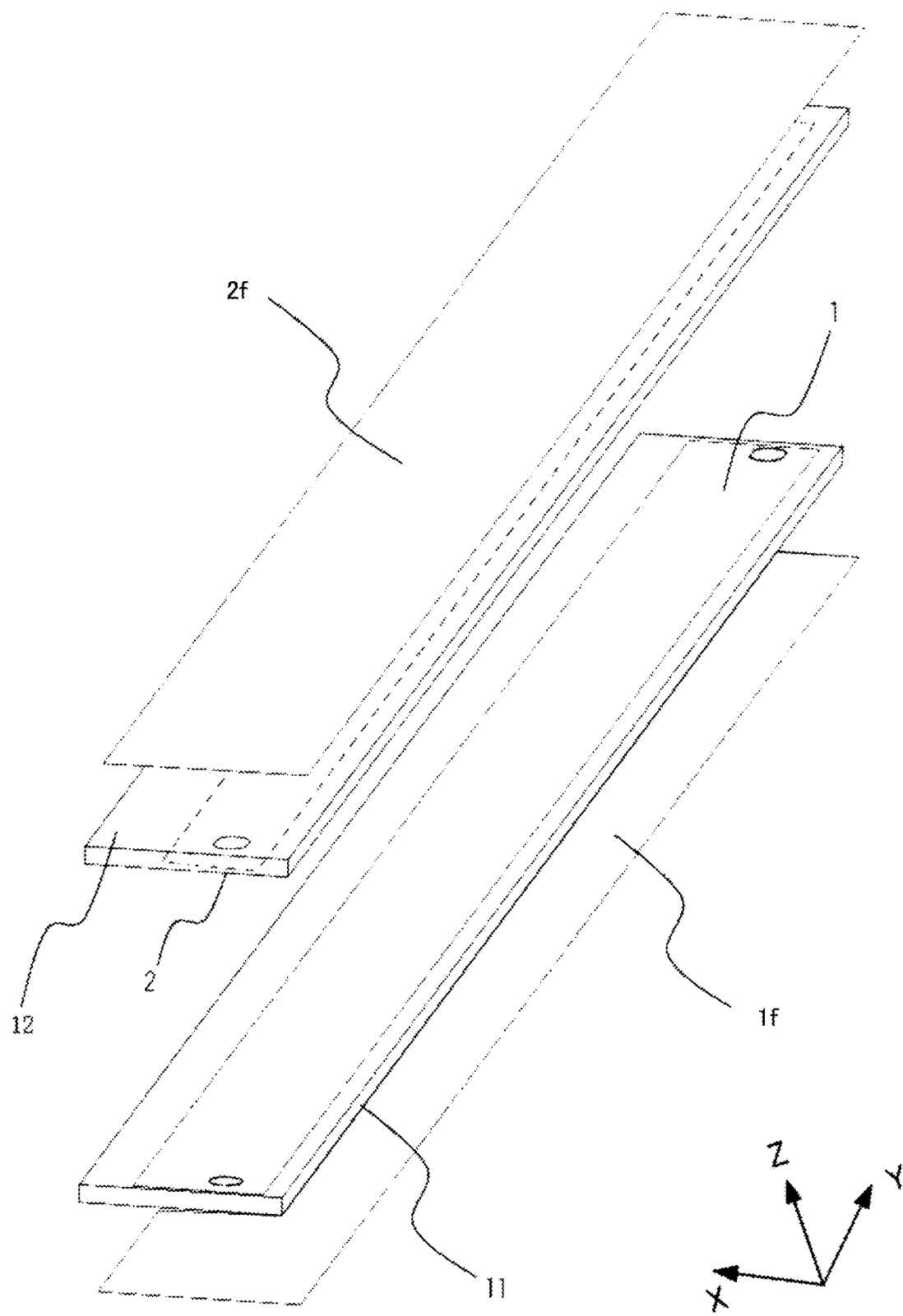
FIG. 16 is a perspective view of important parts including electrodes of an image reading apparatus (electrostatic capacitance detection device) according to the modification of Embodiment 1.
Figure 17:
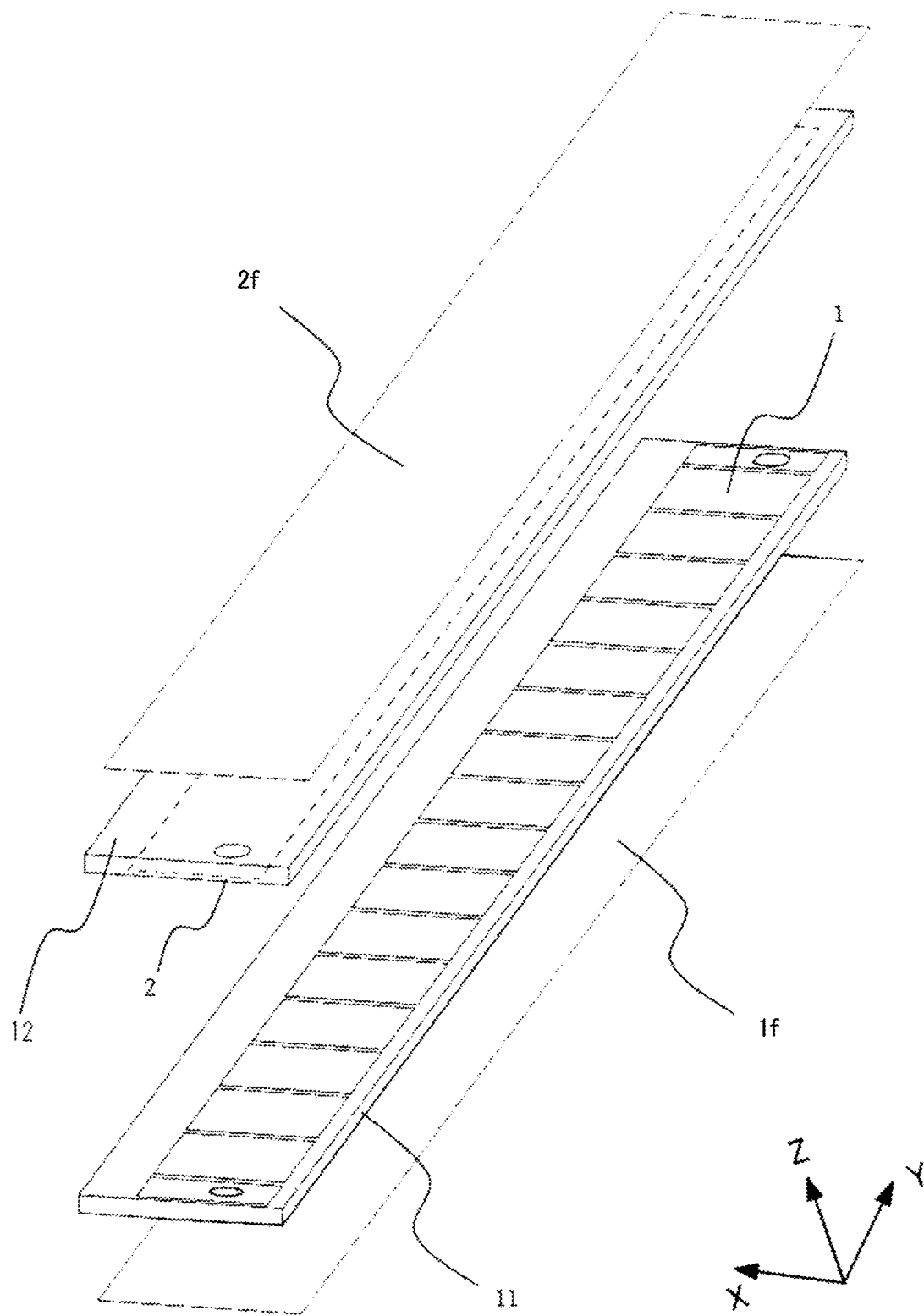
FIG. 17 is a perspective view of important parts including electrodes of an image reading apparatus (electrostatic capacitance detection device) according to the modification of Embodiment 1.

Needless to mention, the configuration illustrated in FIG. 7, 8, or 9 provided with the first floating electrode if and the second floating electrode 2f can also equalize (stabilize) the electric field distribution between the electrodes. The configuration illustrated in FIG. 7 provided with the first floating electrode if and the second floating electrode 2f is illustrated in FIG. 15. The configuration illustrated in FIG. 8 provided with the first floating electrode if and the second floating electrode 2f is illustrated in FIG. 15. The configuration illustrated in FIG. 9 provided with the first floating electrode if and the second floating electrode 2f is illustrated in FIG. 11.

Although the first floating electrode 1f and the second floating electrode 2f are disposed apart from the first substrate 11 and the second substrate 12, respectively, in the examples illustrated in FIGS. 11 and 13 to 17, the first floating electrode 1f and the second floating electrode 2f may also be provided on the first substrate 11 and the second substrate 12, respectively. In other words, the first substrate 11 may be provided with the first electrode 1 on one surface and provided with the first floating electrode 1f on the other surface. Also, the second substrate 12 may be provided with the second electrode 2 on one surface and provided with the second floating electrode 2f on the other surface. The one surface of the first substrate 11 is opposed to the one surface of the second substrate 12 across the transport path 5. In detail, the first flat plate 6 is disposed between the one surface (first electrode 1) of the first substrate 11 and the transport path 5 at a position more adjacent to the first electrode 1. Also, the second flat plate 7 is disposed between the one surface (second electrode 2) of the second substrate 12 and the transport path 5 at a position more adjacent to the second electrode 2.

In other words, the electrostatic capacitance detection device 20 (image reading apparatus 40) according to Embodiment 1 includes the first substrate 11. The first substrate 11 is provided with the first electrode 1 on one surface and provided with the first floating electrode 1f on the other surface. The first substrate 11 is positioned by being bonded or urged on the first flat plate 6 serving as a dielectric. Also, the electrostatic capacitance detection device 20 (image reading apparatus 40) according to Embodiment 1 includes the second substrate 12. The second substrate 12 is provided with the second electrode 2 on one surface and provided with the second floating electrode 2f on the other surface. The second substrate 12 is positioned by being bonded or urged on the second flat plate 7 serving as a dielectric.

Figure 18:
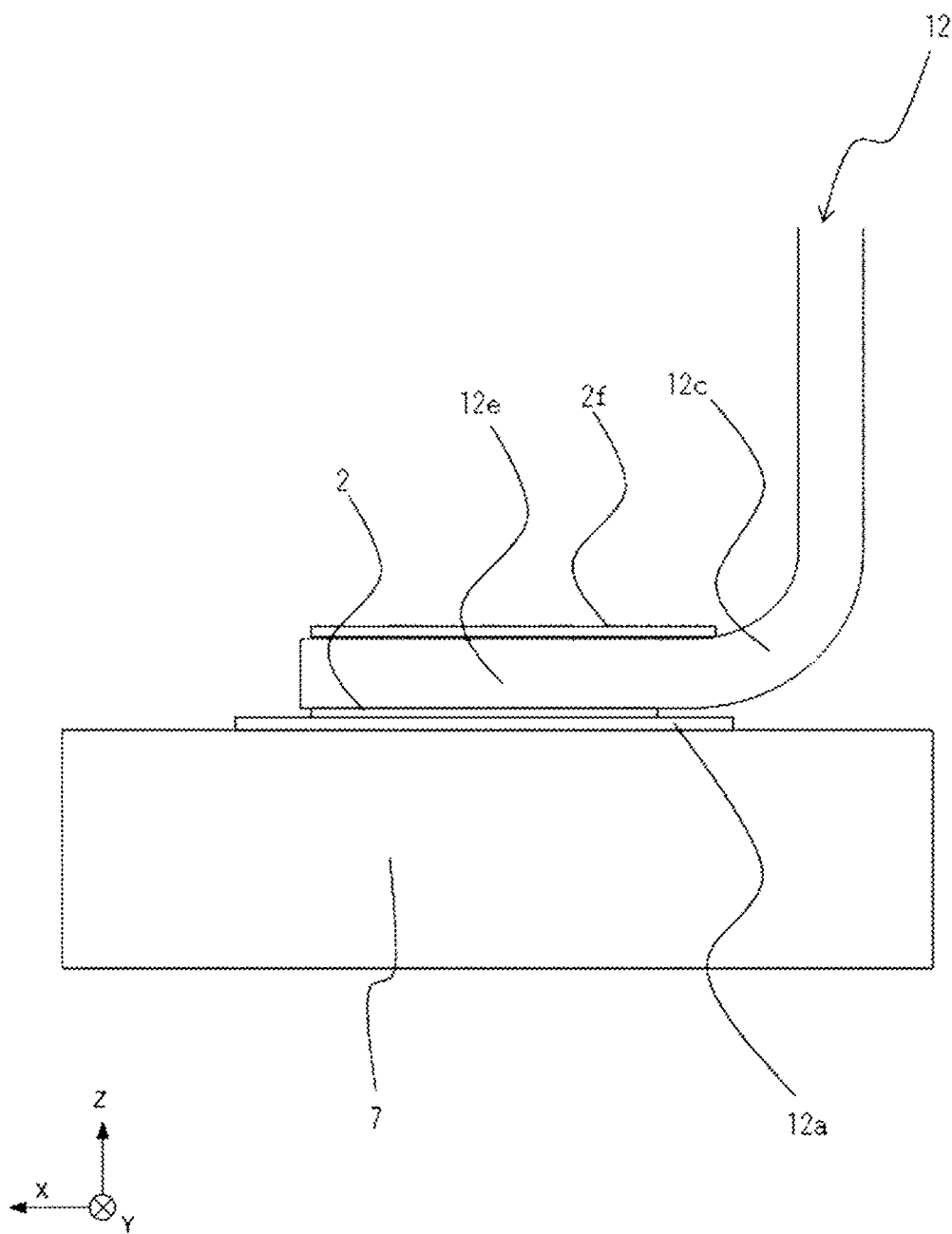
FIG. 18 is a diagram for describing the connection in the important part including the electrode of the image reading apparatus (electrostatic capacitance detection device) according to the modification of Embodiment 1.

As illustrated in FIG. 18, in the case where the second substrate 12 is made of a bent flexible substrate in the electrostatic capacitance detection device 20 (image reading apparatus 40) according to Embodiment 1, the electrode segment 12e is provided with the second electrode 2 on the side of the surface (one surface) containing the ridgeline of the bent segment 12c defined by the bent flexible substrate and provided with the second floating electrode 2f on the side of the surface (other surface) containing the valley line of the bent segment 12c defined by the bent flexible substrate. Also, in the case where the first substrate 11 is made of a bent flexible substrate, the electrode segment 11e is provided with the first electrode 1 on the side of the surface (one surface) containing the ridgeline of the bent segment 11c defined by the bent flexible substrate and provided with the first floating electrode if on the side of the surface (other surface) containing the valley line of the bent segment 11c defined by the bent flexible substrate, although this configuration is not illustrated.

As described above, the electrostatic capacitance detection device 20 (image reading apparatus 40) according to Embodiment 1 includes: the first electrode 1 and the second electrode 2, at least parts of which are opposed to each other across the transport path 5 extending in the transport direction in which the detection target 3 having a sheet shape is transported; the oscillation circuit for causing an electric field to be formed between the first electrode 1 and the second electrode 2; the detection circuit for detecting a change in electrostatic capacitance between the first electrode 1 and the second electrode 2; the first substrate 11 (first substrate 11) and the second substrate 12 (second substrate 12) provided with at least one of the oscillation circuit or the detection circuit; the insulating first flat plate 6 disposed between the first electrode 1 and the transport path 5; and the insulating second flat plate 7 disposed between the second electrode 2 and the transport path 5.

The first substrate 11 may be provided with the first electrode 1 on one surface and provided with the first floating electrode 1f via a spacer on the other surface in order to adjust the distance between the first electrode 1 and the first floating electrode 1f. Alternatively, the first substrate 11 may be provided with the first floating electrode 1f on the other surface and provided with the first electrode 1 via a spacer on the one surface. Also, the second substrate 12 may be provided with the second electrode 2 on one surface and provided with the second floating electrode 2f via a spacer on the other surface in order to adjust the distance between the second electrode 2 and the second floating electrode 2f. Alternatively, the second substrate 12 may be provided with the second floating electrode 2f on the other surface and provided with the second electrode 2 via a spacer on the one surface. The same holds true for the case where the first substrate 11 or the second substrate 12 is made of a flexible substrate.

The above-described electrostatic capacitance detection device 20 (image reading apparatus 40) according to Embodiment 1 is able to form a stable electric field and thus detect a foreign object adhering to a bank note or security, which is a representative example of the detection target 3. The electrostatic capacitance detection device 20 (image reading apparatus 40) is also preferably applied to an apparatus for collecting or cutting the bank note or security after detection and thereby making the bank note or security impassable. The electrostatic capacitance detection device 20 may be accommodated in a housing (housing 13a or housing 13b) other than the housing of the image reading apparatus 40 according to Embodiment 1. The first electrode 1 and the second electrode 2 in the electrostatic capacitance detection device 20 (image reading apparatus 40) according to Embodiment 1 does not necessarily extend across the whole area in the main scanning direction. These electrodes may have lengths shorter than the length of the whole area in the main scanning direction so as to cause the electrostatic capacitance detection device 20 to function as a point sensor for detecting a change in electrostatic capacitance in a part of the detection target 3.

Embodiment 2

The electrostatic capacitance detection device 20 (image reading apparatus 40) according to Embodiment 2 is described with reference to FIGS. 19 to 32. The electrostatic capacitance detection device 20 (image reading apparatus 40) according to Embodiment 2 differs from the electrostatic capacitance detection device 20 (image reading apparatus 40) according to Embodiment 1 in that at least one of the first electrode 1 or the second electrode 2 is provided with a first electric field adjuster 31 or a second electric field adjuster 32 in Embodiment 2. Embodiments 1 and 2 have the identical configurations except for this difference, and these configurations are not be redundantly described. Needless to mention, the first electric field adjuster 31 or the second electric field adjuster 32 according to Embodiment 2 may be applied to the electrostatic capacitance detection device 20 (image reading apparatus 40) according to Embodiment 1. The following description is first directed to the first electric field adjuster 31 with reference to FIGS. 19 to 30 and then directed to the second electric field adjuster 32 according to a modification with reference to FIGS. 31 and 32.

Figure 22:
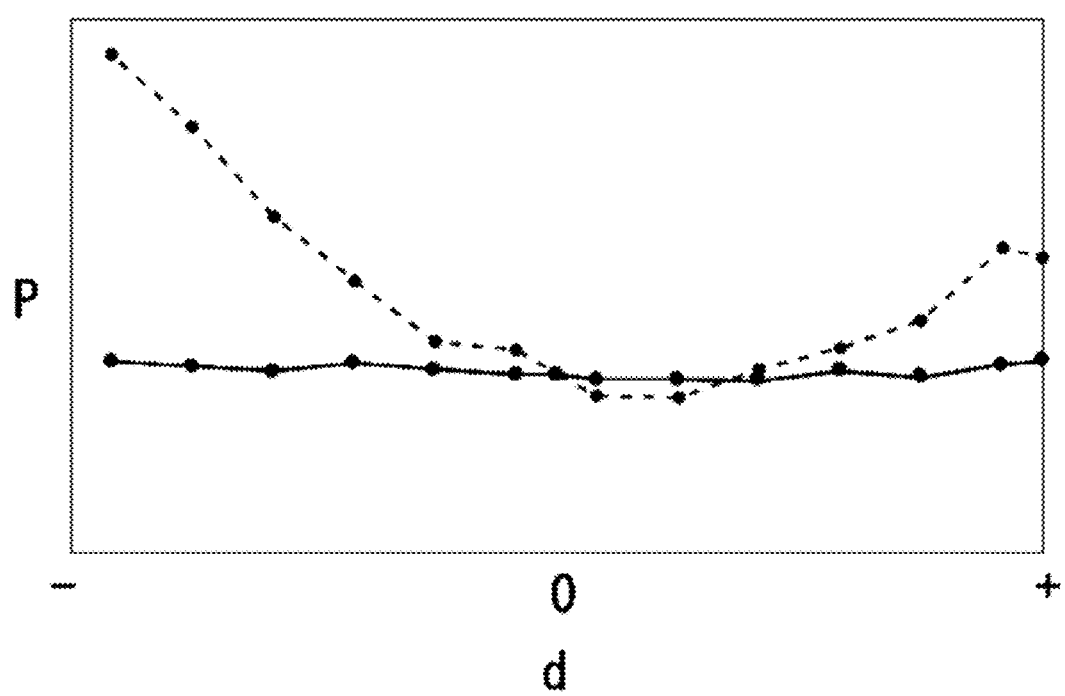
FIG. 22 is a graph illustrating electric field strength distributions at the individual positions between the electrodes in the image reading apparatus (electrostatic capacitance detection device) according to Embodiment 2 and an electrostatic capacitance detection device in a comparative example.

In Embodiment 2, although the figures other than FIG. 22 illustrate only the case where the first electric field adjuster 31 and the second electric field adjuster 32 are provided to the first electrode 1, the same holds true for the case where the first electric field adjuster 31 and the second electric field adjuster 32 are provided to the second electrode 2. Both of the first electrode 1 and the second electrode 2 may be provided with at least one of the first electric field adjuster 31 or the second electric field adjuster 32. Alternatively, one of the electrodes (first electrode 1 and second electrode 2) may be provided with the first electric field adjuster 31 and the second electric field adjuster 32. The first electric field adjuster 31 is provided on the plane identical to the plane provided with the first electrode 1 (second electrode 2) among the planes defined by the X and Y axes. The second electric field adjuster 32 is preferably provided on the plane identical to the plane provided with the first electrode 1 (second electrode 2) among the planes defined by the X and Y axes.

The first electric field adjuster 31 is described with reference to FIGS. 19 to 30. The electrostatic capacitance detection device 20 (image reading apparatus 40) according to Embodiment 2 includes the first electrode 1 corresponding to one of the electrodes, and the second electrode 2 corresponding to the other of the electrodes, at least a part of which is opposed to the first electrode 1 across the transport path 5. The first electrode 1 and the second electrode 2 include conductive patterns defining the profiles of the electrodes. At least one of the first electrode 1 or the second electrode 2 includes the first electric field adjuster 31 for adjusting the electric field 9, which is at least one of the three types including an inner gap 33 formed inside the profile, a notch 34 extending inward from the profile, and a serration 35 defined by the profile having a serrated edge.

Figure 19:
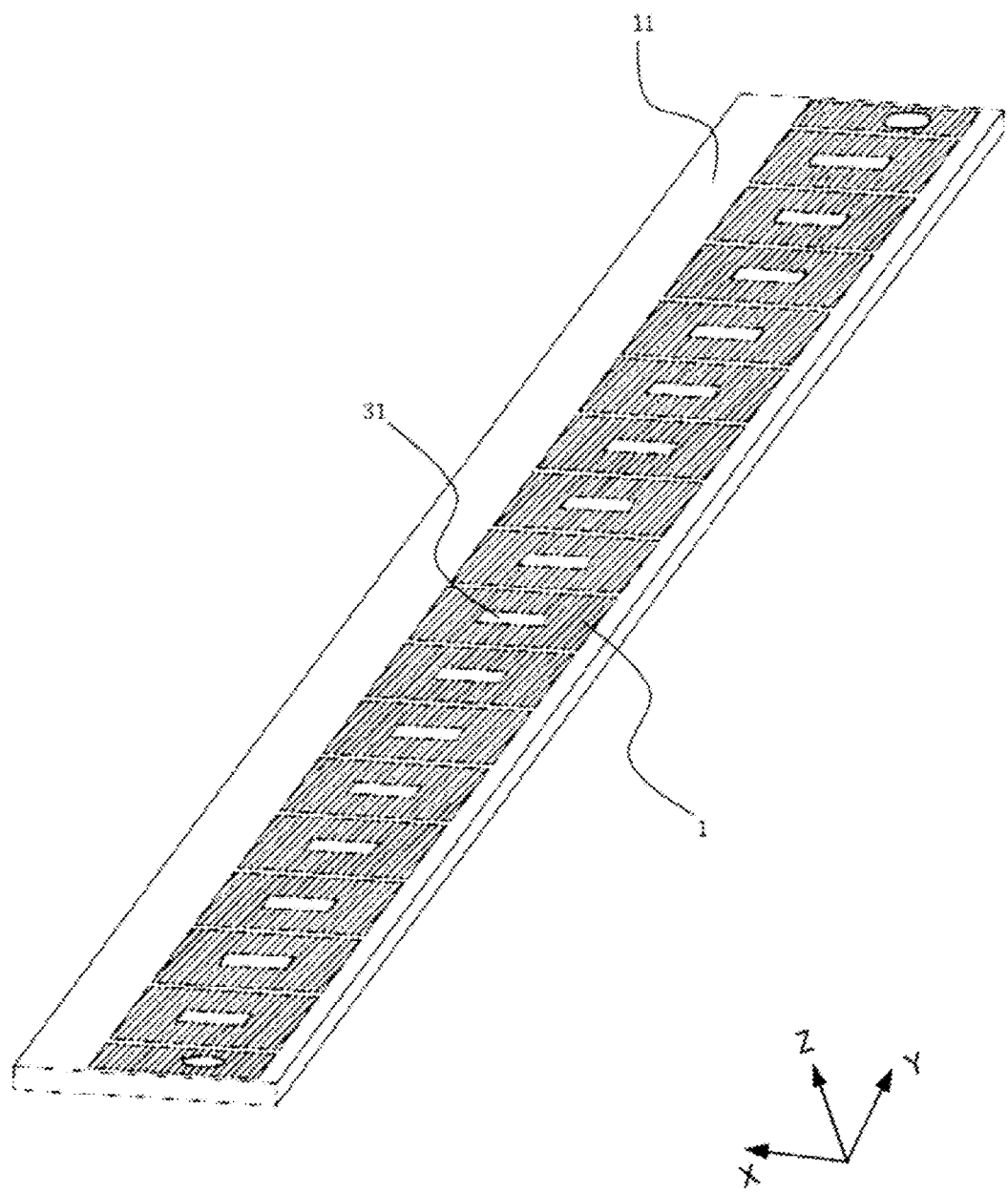
FIG. 19 is a perspective view of an important part including an electrode of an image reading apparatus (electrostatic capacitance detection device) according to Embodiment 2.
Figure 20:
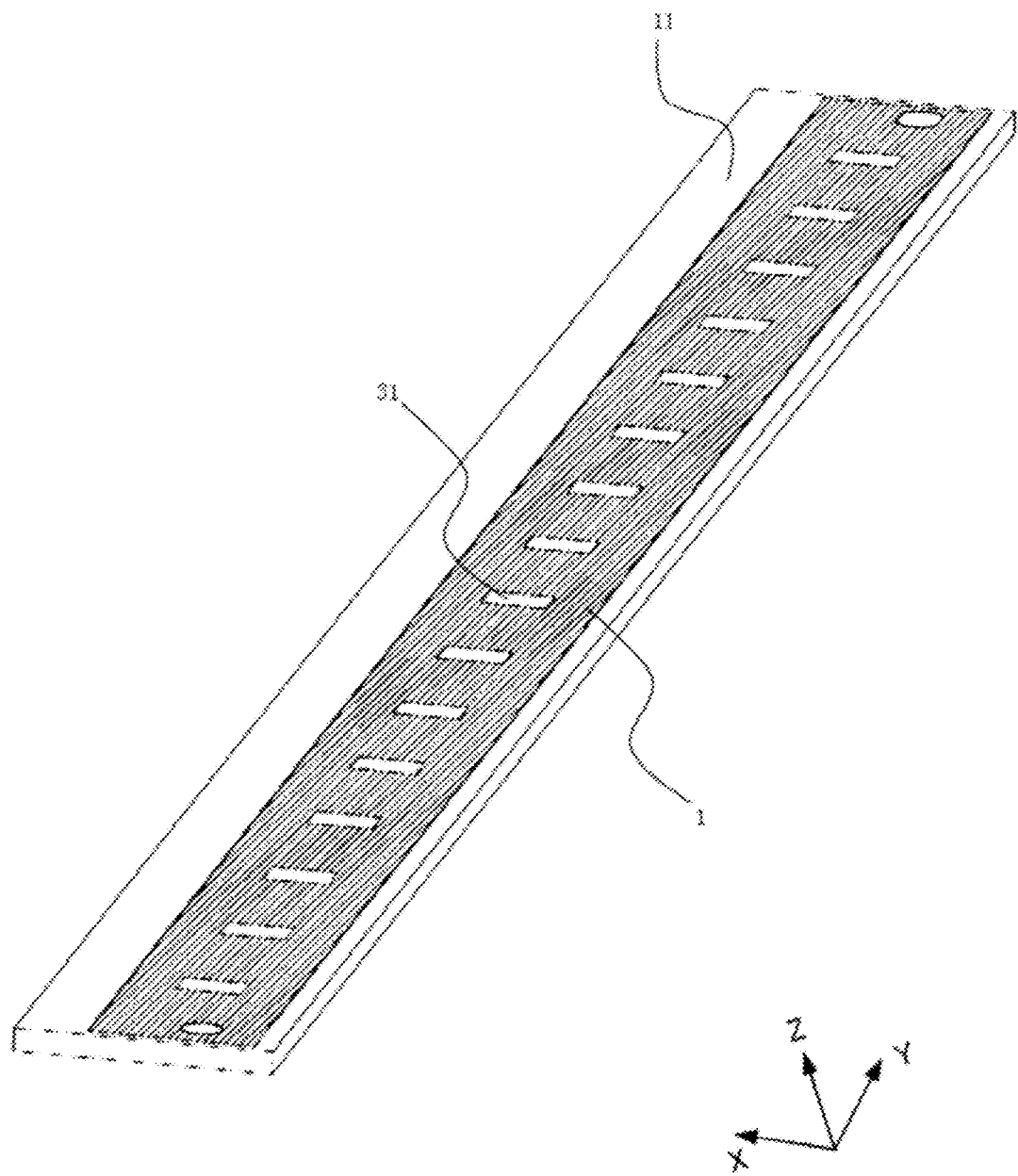
FIG. 20 is a perspective view of the important part including the electrode of the image reading apparatus (electrostatic capacitance detection device) according to Embodiment 2.
Figure 21A:
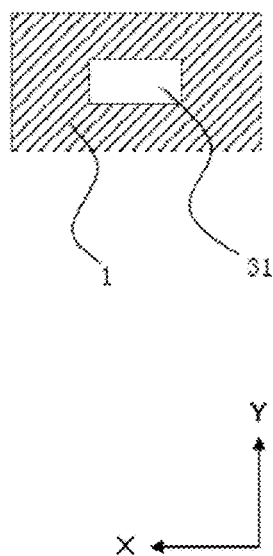
FIG. 21 illustrates the profile of an electrode of the image reading apparatus (electrostatic capacitance detection device) according to Embodiment 2.
Figure 21B:
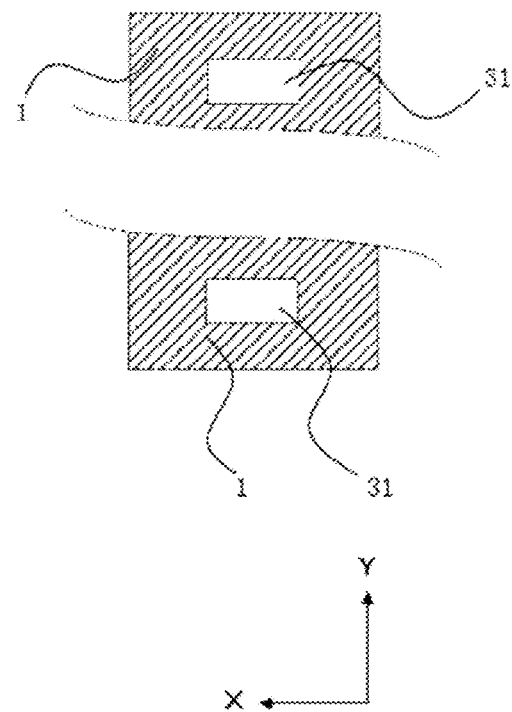

In FIGS. 19 to 21, the first electric field adjuster 31 is the inner gap 33. The inner gap 33 has a shape defined by a hollow formed in the conductive pattern, such as a shape of circle (ellipse or complete round) or polygon. FIGS. 19 to 21 illustrate rectangular inner gaps 33. FIG. 19 illustrates a case where the first electrode 1 includes conductive patterns discontinuous in the cross direction. FIG. 20 illustrates a case where the first electrode 1 includes a conductive pattern continuous in the cross direction. The section (A) of FIG. 21 illustrates one of the conductive patterns of the first electrode 1 illustrated in FIG. 19. The section (B) of FIG. 21 illustrates the conductive pattern of the first electrode 1 illustrated in FIG. 20 of which the middle part is omitted. Needless to mention, one of the conductive patterns of the first electrode 1 illustrated in FIG. 19 may be provided with a plurality of first electric field adjusters 31 (inner gaps 33).

FIG. 22 is a graph illustrating electric field strength distributions at the individual positions between the electrodes in the electrostatic capacitance detection device 20 (electrostatic capacitance detection device 20 according to Embodiment 2) in which the first electric field adjuster 31 illustrated in FIGS. 19 to 21 is also provided to the second electrode 2, and an electrostatic capacitance detection device (electrostatic capacitance detection device in a comparative example) in which no first electric field adjuster 31 is provided to the first electrode 1 or the second electrode 2. In FIG. 22, the vertical axis indicates an electric field strength distribution (P), and the horizontal axis indicates a gap d representing a position between the electrodes (first electrode 1 and second electrode 2). The solid line represents the electric field strength distribution in the electrostatic capacitance detection device 20 according to Embodiment 2. The black-and-white dashed line represents the electric field strength distribution in the electrostatic capacitance detection device in a comparative example.

In FIG. 22, "0" in the horizontal axis corresponds to the electric field strength at the midpoint between the first electrode 1 and the second electrode 2 within the transport path 5. The negative side in the horizontal axis corresponds to the side of the first electrode 1. The positive side in the horizontal axis corresponds to the side of the second electrode 2. As is apparent from FIG. 22, in the electrostatic capacitance detection device 20 (image reading apparatus 40) according to Embodiment 2, variations in the strength of the electric field 9 in the vicinities of both of the first electrode 1 (negative side) and the second electrode 2 (positive side) within the transport path 5 are smaller than those in the comparative example. A variation in the electric field strength in the vicinity of the first electrode 1 can be reduced by providing the first electrode 1 with the first electric field adjuster 31. Also, a variation in the electric field strength in the vicinity of the second electrode 2 can be reduced by providing the second electrode 2 with the first electric field adjuster 31.

Figure 23A:
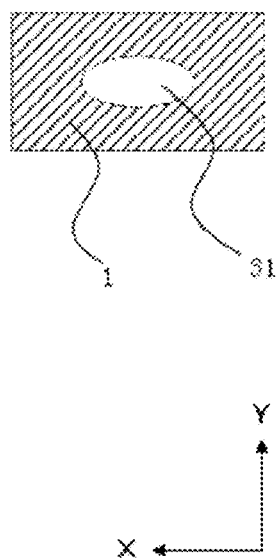
FIG. 23 illustrates the profile of an electrode of the image reading apparatus (electrostatic capacitance detection device) according to Embodiment 2.
Figure 23B:
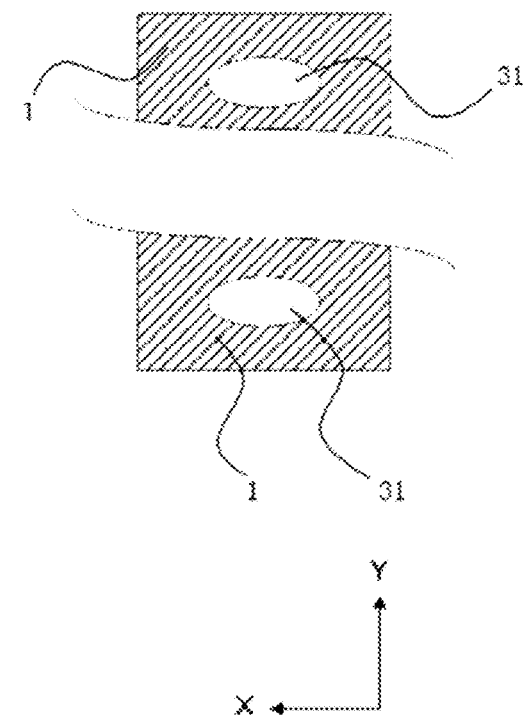

FIG. 23 illustrates an example in which the first electric field adjuster 31 (inner gap 33) has an elliptical shape. The section (A) of FIG. 23 illustrates one of the conductive patterns discontinuous in the cross direction and included in the first electrode 1. The section (B) of FIG. 23 illustrates the conductive pattern continuous in the cross direction and included in the first electrode 1 of which the middle part is omitted. Needless to mention, one of the conductive patterns of the first electrode 1 illustrated in the section (A) of FIG. 23 may be provided with a plurality of first electric field adjusters 31 (inner gaps 33). The first electric field adjuster 31 (inner gap 33) has a shape defined by a hollow formed in the conductive pattern of the first electrode 1 (second electrode 2). The first electric field adjuster 31 (inner gap 33) is also deemed as an opening formed in a conductive pattern of the first electrode 1 (second electrode 2).

The first electric field adjuster 31 may also be the notch 34. The notch 34 defines the profile of the first electrode 1 or the second electrode 2 having at least one of a Π shape, an E shape, or a step shape.

Figure 24A:
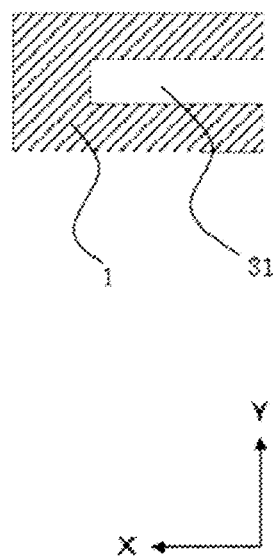
FIG. 24 illustrates the profile of an electrode of the image reading apparatus (electrostatic capacitance detection device) according to Embodiment 2.
Figure 24B:
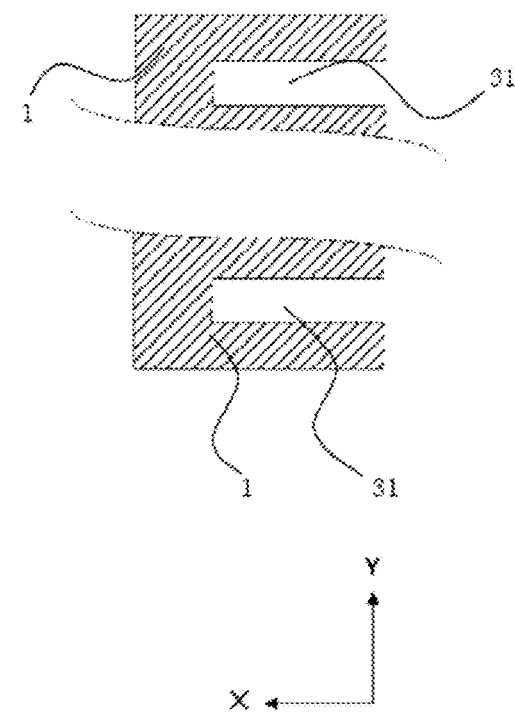
Figure 25A:
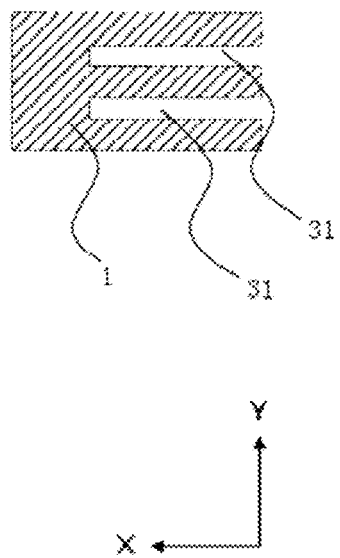
FIG. 25 illustrates the profile of an electrode of the image reading apparatus (electrostatic capacitance detection device) according to Embodiment 2.
Figure 25B:
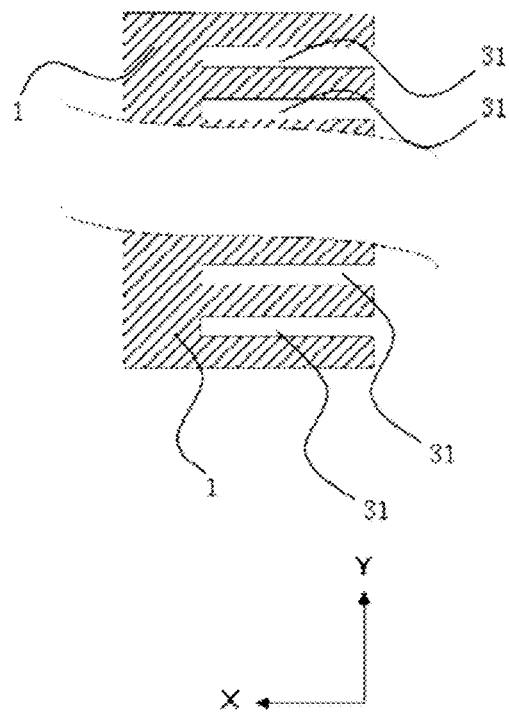

FIG. 24 illustrates an example in which the first electric field adjuster 31 (notch 34) defines a Π shape. The section (A) of FIG. 24 illustrates one of the conductive patterns discontinuous in the cross direction and included in the first electrode 1. The section (B) of FIG. 24 illustrates the conductive pattern continuous in the cross direction and included in the first electrode 1 of which the middle part is omitted. Needless to mention, one of the conductive patterns of the first electrode 1 illustrated in the section (A) of FIG. 24 may be provided with a plurality of first electric field adjusters 31 (notches 34). This structure corresponds to the first electric field adjusters 31 (notches 34) defining an E shape as illustrated in FIG. 25. The structure also corresponds to the comb-teeth notches 34.

FIG. 25 illustrates an example in which the first electric field adjusters 31 (notches 34) define an E shape. The section (A) of FIG. 25 illustrates one of the conductive patterns discontinuous in the cross direction and included in the first electrode 1. The section (B) of FIG. 25 illustrates the conductive pattern continuous in the cross direction and included in the first electrode 1 of which the middle part is omitted. Needless to mention, one of the conductive patterns of the first electrode 1 illustrated in the section (A) of FIG. 25 may be provided with a plurality of first electric field adjusters 31 (notches 34). This structure corresponds to the comb-teeth notches 34. The notches 34 defining a step shape, which are not illustrated in the figures, are the comb-teeth notches 34 of which the narrow conductive patterns have lengths in the transport direction varied to define a step shape.

Figure 26A:
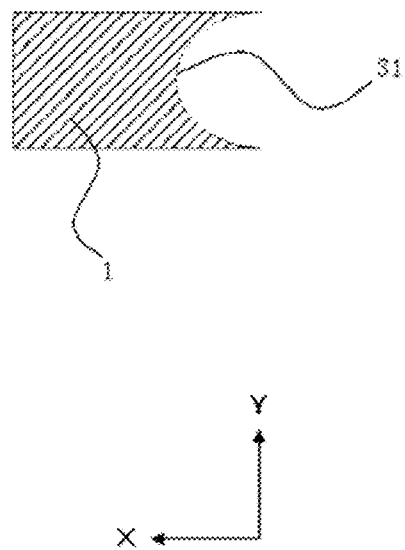
FIG. 26 illustrates the profile of an electrode of the image reading apparatus (electrostatic capacitance detection device) according to Embodiment 2.
Figure 26B:
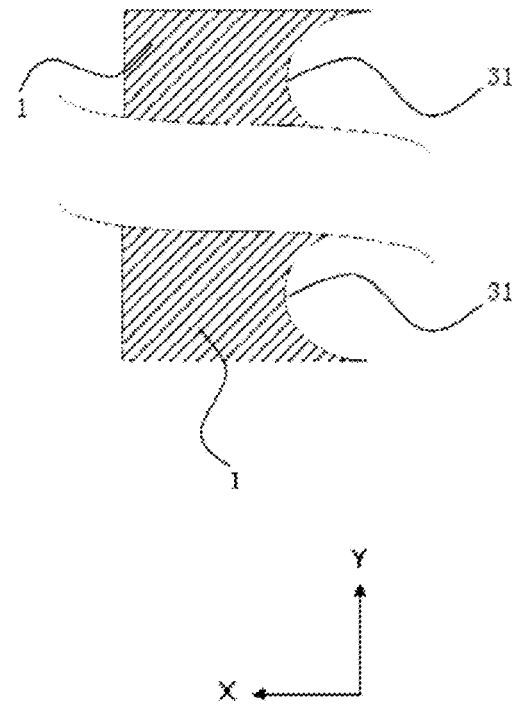
Figure 27A:
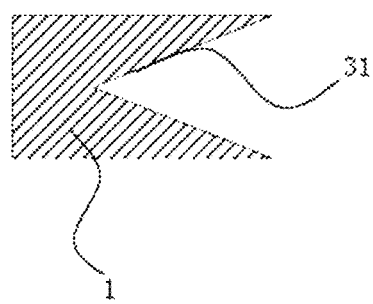
FIG. 27 illustrates the profile of an electrode of the image reading apparatus (electrostatic capacitance detection device) according to Embodiment 2.
Figure 27A:
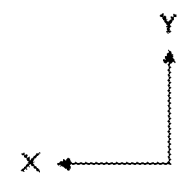
Figure 27B:
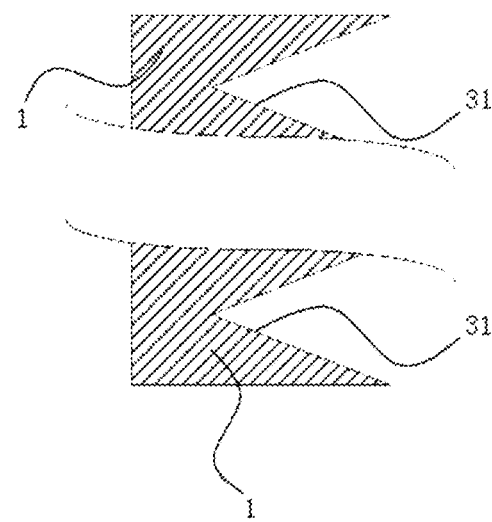
Figure 27B:
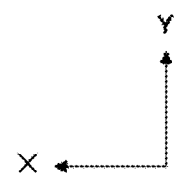

FIG. 26 illustrates an example in which the first electric field adjuster 31 (notch 34) defines a curved II shape. The section (A) of FIG. 26 illustrates one of the conductive patterns discontinuous in the cross direction and included in the first electrode 1. The section (B) of FIG. 26 illustrates the conductive pattern continuous in the cross direction and included in the first electrode 1 of which the middle part is omitted. Needless to mention, one of the conductive patterns of the first electrode 1 illustrated in the section (A) of FIG. 26 may be provided with a plurality of first electric field adjusters 31 (notches 34). This structure corresponds to the first electric field adjusters 31 (notches 34) defining an E shape illustrated in FIG. 25 that has curved edges.

FIG. 27 illustrates an example in which the first electric field adjuster 31 (notch 34) defines a pointed II shape. The section (A) of FIG. 27 illustrates one of the conductive patterns discontinuous in the cross direction and included in the first electrode 1. The section (B) of FIG. 27 illustrates the conductive pattern continuous in the cross direction and included in the first electrode 1 of which the middle part is omitted. Needless to mention, one of the conductive patterns of the first electrode 1 illustrated in the section (A) of FIG. 27 may be provided with a plurality of first electric field adjusters 31 (notches 34). This structure corresponds to the first electric field adjusters 31 (notches 34) defining an E shape illustrated in FIG. 25 that has pointed ends.

The first electric field adjuster 31 may also be the serration 35. The serration 35 defines the profile of the first electrode 1 or the second electrode 2 having at least one of a triangular serrated edge, a rectangular serrated edge, or a wave-like serrated edge. The notches 34 described with reference to FIGS. 24 to 27 may also be called the serrations 35. For example, the notches 34 illustrated in FIGS. 24 and 25 correspond to the serrations 35 defining rectangular serrated edges.

Figure 28A:
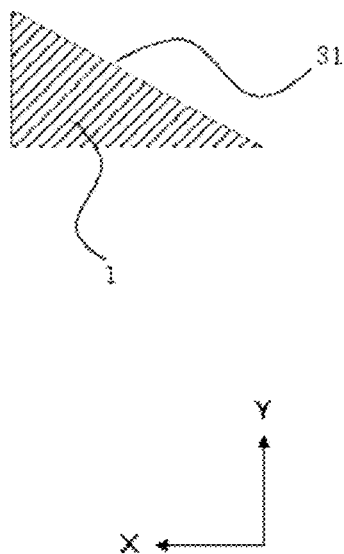
FIG. 28 illustrates the profile of an electrode of the image reading apparatus (electrostatic capacitance detection device) according to Embodiment 2.
Figure 28B:
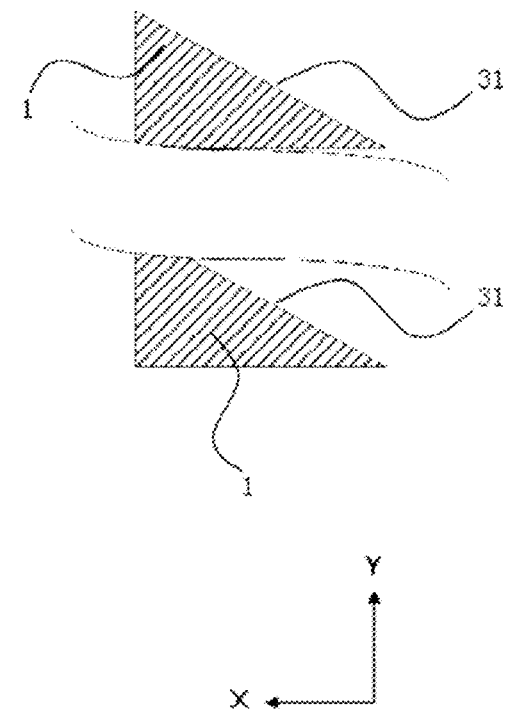

FIG. 28 illustrates an example in which the first electric field adjuster 31 (serration 35) defines a triangular serrated edge. The section (A) of FIG. 28 illustrates one of the conductive patterns discontinuous in the cross direction and included in the first electrode 1. The section (B) of FIG. 28 illustrates the conductive pattern continuous in the cross direction and included in the first electrode 1 of which the middle part is omitted. Needless to mention, one of the conductive patterns of the first electrode 1 illustrated in the section (A) of FIG. 28 may be provided with a plurality of first electric field adjusters 31 (serrations 35).

Figure 29A:
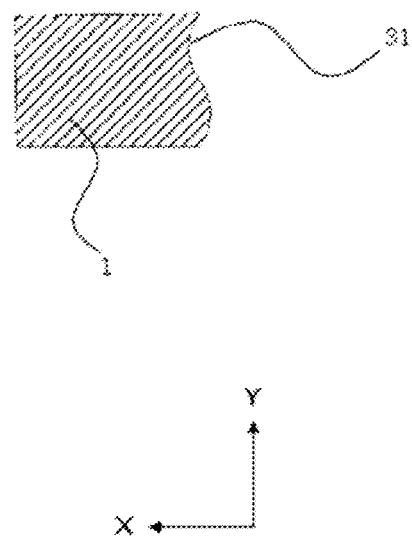
FIG. 29 illustrates the profile of an electrode of the image reading apparatus (electrostatic capacitance detection device) according to Embodiment 2.
Figure 29B:
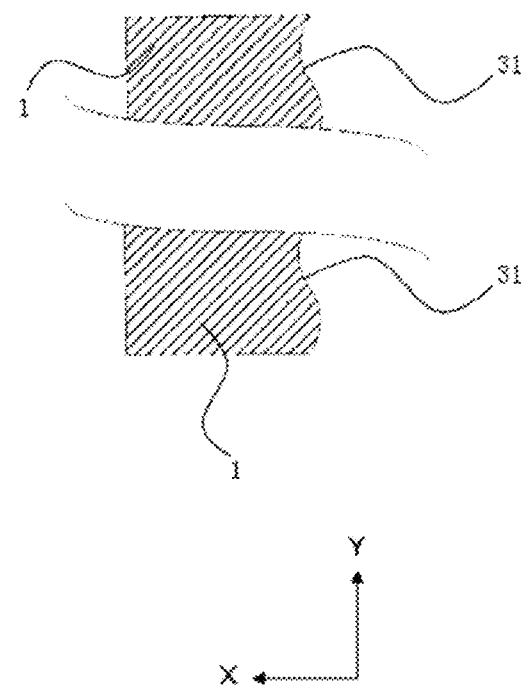
Figure 30A:
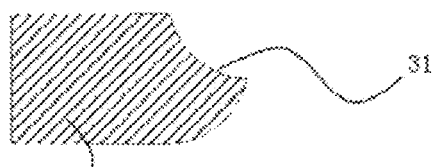
FIG. 30 illustrates the profile of an electrode of the image reading apparatus (electrostatic capacitance detection device) according to Embodiment 2.
Figure 30A:
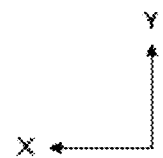
Figure 30B:
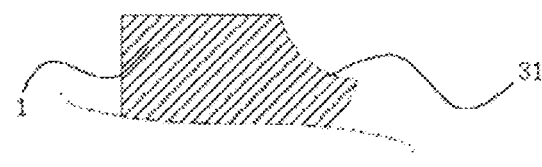
Figure 30B:
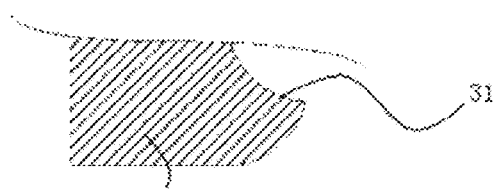
Figure 30B:
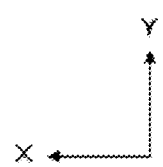

FIGS. 29 and 30 each illustrate an example in which the first electric field adjuster 31 (serration 35) defines a wave-like serrated edge. The section (A) of FIG. 29 and the section (A) of FIG. 30 each illustrate one of the conductive patterns discontinuous in the cross direction and included in the first electrode 1. The section (B) of FIG. 29 and the section (B) of FIG. 30 each illustrate the conductive pattern continuous in the cross direction and included in the first electrode 1 of which the middle part is omitted. Needless to mention, one of the conductive patterns of the first electrode 1 illustrated in the section (A) of FIG. 29 or the section (A) of FIG. 30 may be provided with a plurality of first electric field adjusters 31 (serrations 35). The serration 35 illustrated in FIG. 29 differs from the serration 35 illustrated in FIG. 30 in the steepness of the curve. The serration 35 illustrated in FIG. 30 defines a steeper curve. Such a serration 35 defining a steeper curve corresponds to the comb-tooth notch 34. Needless to mention, the serration 35 illustrated in FIG. 29 may also be called the comb-teeth notch 34 based on another definition.

The above description is directed to an example in which the notch 34 or the serration 35, serving as the first electric field adjuster 31, is formed along one edge of the first electrode 1 (second electrode 2) extending in the cross direction on one side in the transport direction. Needless to mention, the notch 34 or the serration 35, serving as the first electric field adjuster 31, may also be formed along the other edge of the first electrode 1 (second electrode 2) extending in the cross direction on the other side in the transport direction. Alternatively, the notch 34 or the serration 35, serving as the first electric field adjuster 31, may be formed along both edges.

In the case where the first electrode 1 (second electrode 2) includes conductive patterns discontinuous in the cross direction, the notches 34 or the serrations 35, serving as the first electric field adjusters 31, may be formed along either of the two edges of the first electrode 1 (second electrode 2) extending in the transport direction. This idea can be applied to the case where the first electrode 1 (second electrode 2) includes a conductive pattern continuous in the cross direction, in the manner described below. Some of the notches 34 or the serrations 35, serving as the first electric field adjusters 31, other than those formed along at least one of the edges in the cross direction, are located inside the profile of the first electrode 1 (second electrode 2), so that the notches 34 or the serrations 35 have a shape defined by a hollow formed in the conductive pattern of the first electrode 1 (second electrode 2) or are deemed as openings formed in the conductive pattern of the first electrode 1 (second electrode 2). These notches 34 or serrations 35, serving as the first electric field adjusters 31, correspond to the inner gaps 33.

These first electric field adjusters 31, corresponding to the inner gaps 33 derived from the notches 34 or the serrations 35, may be located at a position deviated from the center of the first electrode 1 (second electrode 2) in the transport direction. In the case where the first electrode 1 (second electrode 2) includes conductive patterns discontinuous in the cross direction, the first electric field adjusters 31 corresponding to the inner gaps 33 may be located at a position deviated from the center of the first electrode 1 (second electrode 2) in the cross direction. Although the inner gaps 33 illustrated in FIGS. 19, 20, 21, and 23 are located at the center of the first electrode 1 in the transport direction, these inner gaps 33 may also be located at a position deviated from the center. Although the inner gaps 33 illustrated in FIG. 19, the section (A) of FIG. 21, and the section (A) of FIG. 23 are located at the center of the first electrode 1 in the cross direction, these inner gaps 33 may also be located at a position deviated from the center.

As described above, the first electric field adjuster 31 defines a portion containing conductive patterns discontinuous in the transport direction at any position in the cross direction, or defines a portion containing conductive patterns having mutually different lengths in the transport direction at any position in the cross direction. In detail, in a case in which the first electric field adjuster 31 is the inner gap 33, the electrode has a portion containing conductive patterns discontinuous in the transport direction at any position in the cross direction because of the conductive pattern interrupted by the inner gap 33. In a case in which the first electric field adjuster 31 is the notch 34 or the serration 35, the electrode has a portion containing conductive patterns having mutually different lengths in the transport direction at any position in the cross direction because of a variation in length of the conductive patterns caused by the notch 34 or the serration 35.

In Embodiment 2, the first electrode 1 and the second electrode 2 may have the identical shape. Needless to mention, the first electrode 1 and the second electrode 2 may have the identical profile but may be provided with the first electric field adjusters 31 having mutually different shapes. Alternatively, the first electrode 1 and the second electrode 2 may have mutually different profiles but may be provided with the first electric field adjusters 31 having the identical shape.

The second electric field adjuster 32 according to the modification is now described with reference to FIGS. 31 and 32. The electrostatic capacitance detection device 20 (image reading apparatus 40) according to the modification of Embodiment 2 includes the first electrode 1 corresponding to one of the electrodes, and the second electrode 2 corresponding to the other of the electrodes, at least a part of which is opposed to the first electrode 1 across the transport path 5. The first electrode 1 and the second electrode 2 include conductive patterns defining the profiles of the electrodes. At least one of the first electrode 1 or the second electrode 2 includes the second electric field adjuster 32 for adjusting the electric field 9, which is a grounded ground pattern 37 around the electrode via an outer gap 36 disposed outside the profile. Both of the outer gap 36 and the ground pattern 37 may be included in the second electric field adjuster 32. The ground pattern 37 is also deemed as a bypass for the first electrode 1 or the second electrode 2. The ground pattern 37, which is a conductive pattern separate from the first electrode 1 and the second electrode 2, may be defined by the outer gap 36 formed by etching or milling of the original conductive pattern. The first electrode 1, the second electrode 2, and the second electric field adjuster 32 affect formation of an electric field between the first electrode 1 and the second electrode 2. Accordingly, the configuration can be expressed such that at least one of the first electrode 1 or the second electrode 2 is provided with the second electric field adjuster 32.

Figure 31A:
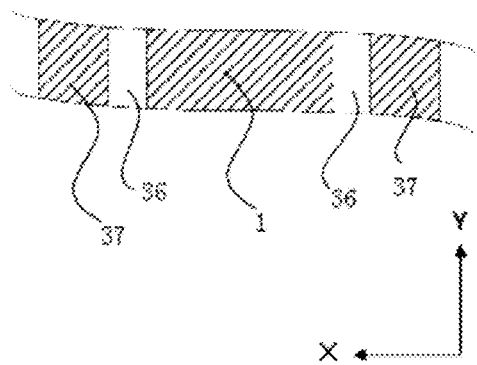
FIG. 31 illustrates the profile of an electrode of the image reading apparatus (electrostatic capacitance detection device) according to Embodiment 2.
Figure 31B:
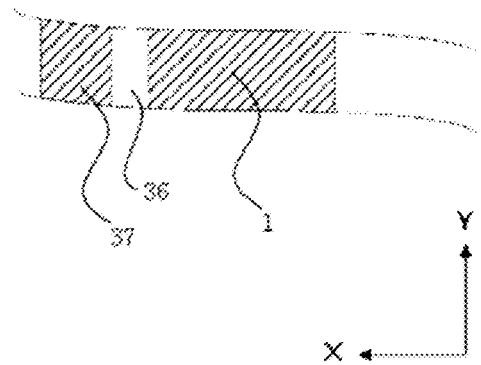
Figure 31C:
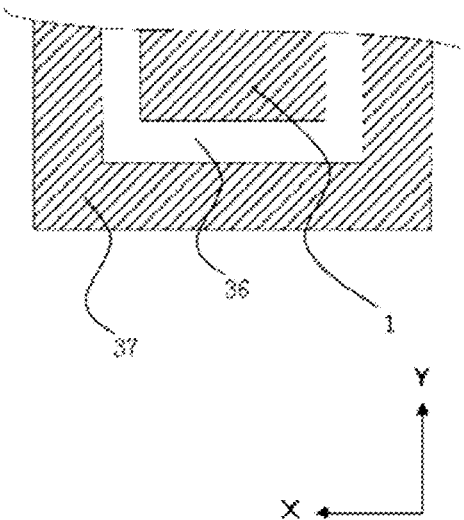
Figure 32:
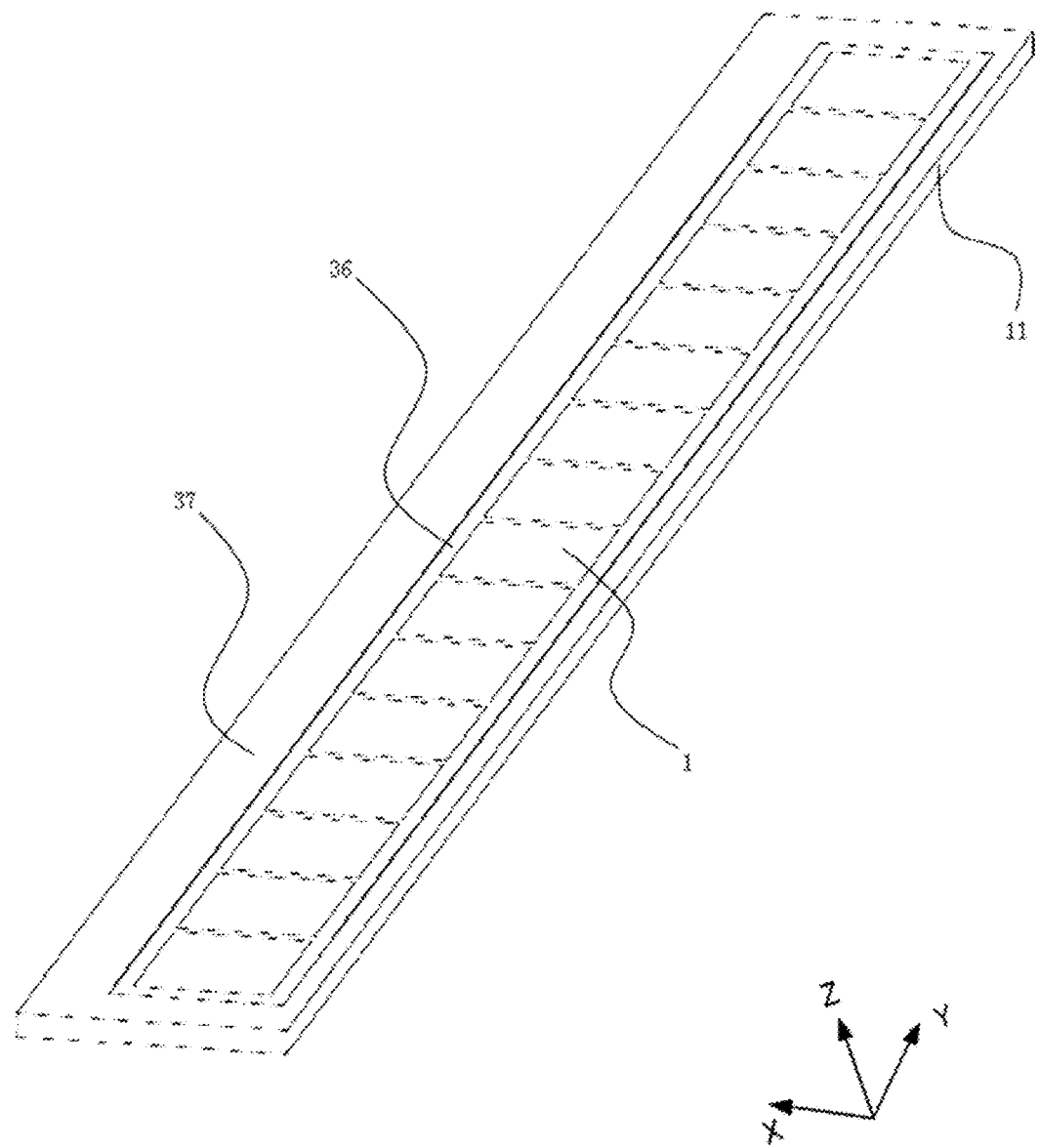
FIG. 32 is a perspective view of an important part including an electrode of an image reading apparatus (electrostatic capacitance detection device) according to a modification of Embodiment 2.

In FIGS. 31 and 32, the second electric field adjuster 32 includes the outer gap 36 and the ground pattern 37, or the ground pattern 37 alone. The outer gap 36 is a gap formed between the first electrode 1 and the ground pattern 37. The section (A) of FIG. 31 illustrates a case where the ground patterns 37 are formed along the two edges of the first electrode 1 extending in the cross direction. The section (B) of FIG. 31 illustrates a case where the ground pattern 37 is formed along the edge of the first electrode 1 extending in the cross direction on the other side in the transport direction. Needless to mention, the ground pattern 37 may be formed along the other edge of the first electrode 1 extending in the cross direction on the one side in the transport direction. The section (C) of FIG. 31 and FIG. 32 illustrate a case where the continuous ground pattern 37 is formed along the two edges of the first electrode 1 extending in the cross direction and the two edges of the first electrode 1 extending in the transport direction. Such a ground pattern 37 corresponds to a guard ring 37.

In other words, the guard ring 37 (ground pattern 37) surrounds at least one of the first electrode 1 or the second electrode 2 via the outer gap 36. For example, the guard ring 37 (ground pattern 37) may also have a Π shape. In detail, the guard ring 37 is open at one edge of the first electrode 1 (second electrode 2) extending in the cross direction or at one edge of the first electrode 1 (second electrode 2) extending in the transport direction. In the modification of Embodiment 2, the first electrode 1 and the second electrode 2 may have the identical shape. Needless to mention, the first electrode 1 and the second electrode 2 may have the identical profile but may be provided with the second first electric field adjusters 32 having mutually different shapes. Alternatively, the first electrode 1 and the second electrode 2 may have mutually different profiles but may be provided with the second electric field adjusters 32 having the identical shape.

Although the edges of the ground pattern 37 adjacent to the outer gap 36 are indicated by the straight lines in FIGS. 31 and 32, the ground pattern 37 may have an edge adjacent to the outer gap 36 like that defined by the notches 34 or the serrations 35. In the case where the first electrode 1 (second electrode 2) is provided with the notches 34 or the serrations 35, the edge of the ground pattern 37 opposed to the outer gap 36 (edge of the ground pattern 37 adjacent to the outer gap 36) may also be provided with the notches 34 or the serrations 35 identical to those in the first electrode 1 (second electrode 2). In this case, the notches 34 or the serrations 35 of the ground pattern 37 may be adjusted so as to achieve the uniform distance (uniform length of the outer gap 36) between the ground pattern 37 and the first electrode 1 (second electrode 2) opposed to each other.

In the electrostatic capacitance detection device (image reading apparatus) according to the modification of Embodiment 2, the second electric field adjuster 32 provided to the first electrode 1 and the second electrode 2 can reduce variations in the electric field strength in the vicinities of both of the first electrode 1 and the second electrode 2 within the transport path 5, like the first electric field adjuster 31, although this effect is not illustrated in any graph. A variation in the electric field strength in the vicinity of the first electrode 1 can be reduced by providing the first electrode 1 with the second electric field adjuster 32. Also, a variation in the electric field strength in the vicinity of the second electrode 2 can be reduced by providing the second electrode 2 with the second electric field adjuster 32. Needless to mention, the first electric field adjuster 31 and the second electric field adjuster 32 may be provided in combination. That is, one of the first electrode 1 and the second electrode 2 may be provided with the first electric field adjuster 31 while the other may be provided with the second electric field adjuster 32.

The electrostatic capacitance detection device (image reading apparatus) according to the present disclosure includes the first electrode 1, and the second electrode 2 at least a part of which is opposed to the first electrode 1 across the transport path 5. The first electrode 1 and the second electrode 2 extend in the cross direction intersecting the transport direction and have mutually different shapes. Alternatively, the electrostatic capacitance detection device further includes the first floating electrode 1f disposed on the side of the first electrode 1 opposite to the transport path 5, and the second floating electrode 2f disposed on the side of the second electrode 2 opposite to the transport path 5. Alternatively, at least one of the first electrode 1 or the second electrode 2 is provided with the first electric field adjuster 31 or the second electric field adjuster 32.

In the electrostatic capacitance detection device (image reading apparatus) according to the present disclosure, the first electrode 1 and the second electrode 2 having the profiles defined by the conductive patterns does not necessarily include conductive patterns formed on a substrate (dielectric base), such as the first substrate 11 or the second substrate 12, and may also be made of a metal plate. The inner gap 33 and the outer gap 36 in Embodiment 2 may thus be exposed areas of the substrate (dielectric base) or spaces. The ground pattern 37 having the profile defined by the conductive pattern does not necessarily include a conductive pattern formed on the substrate (dielectric base), such as the first substrate 11 or the second substrate 12, and may be made of a metal plate.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 First electrode
1f Floating electrode
2 Second electrode
2f Floating electrode
3 Detection target
5 Transport path
6 First flat plate
7 Second flat plate
7 Cover member (cover glass)
9 Electric field
11 First substrate
11a, 12a Cushioning member (adhesive layer)
12 Second substrate
11c, 12c Bent segment
11e, 12e Electrode segment
13a, 13b Housing
14 Image reader
141 First reading position
142 Second reading position
15 Lens element
16 Sensor element
17 Circuit board
17c Connector
18a, 18b Light source
20 Electrostatic capacitance detection device
31 First electric field adjuster
32 Second electric field adjuster
33 Inner gap
34 Notch
35 Serration
36 Outer gap
37 Ground pattern (guard ring)
40 Image reading apparatus

The invention claimed is:

1. An electrostatic capacitance detection device to detect a change in electrostatic capacitance based on an electric field formed between electrodes, the electrodes comprising a first electrode and a second electrode comprising conductive patterns defining profiles of the electrodes, the electrostatic capacitance detection device comprising:

the first electrode corresponding to one of the electrodes;

the second electrode corresponding to another of the electrodes, at least a part of the second electrode being opposed to the first electrode across a transport path extending in a transport direction in which a detection target having a sheet shape is transported;

a first floating electrode disposed on a side of the first electrode opposite to the transport path;

a second floating electrode disposed on a side of the second electrode opposite to the transport path; and a first substrate provided with the first electrode on one surface and provided with the first floating electrode on another surface, wherein the first substrate comprises a bent flexible substrate and is provided with the first electrode on a surface containing a ridgeline.

2. The electrostatic capacitance detection device according to claim 1, wherein at least one of the first electrode or the second electrode comprises a second electric field adjuster for adjusting the electric field, the second electric field adjuster comprising a ground pattern around the electrode via an outer gap disposed outside the profile.

3. The electrostatic capacitance detection device according to claim 2, wherein the ground pattern surrounds the at least one of the first electrode or the second electrode via the outer gap.

4. The electrostatic capacitance detection device according to claim 1, wherein the first electrode and the second electrode are located in the transport path at a position downstream of a first image reader in the transport direction, the first image reader reading an image of the detection target at a first reading position, the first electrode and the second electrode are located in the transport path at a position upstream of a second image reader in the transport direction, the second image reader reading an image of the detection target at a second reading position, and the first electrode and the second electrode are located between the first reading position and the second reading position.

5. An image reading apparatus comprising:

the electrostatic capacitance detection device according to claim 4;

the first image reader; and the second image reader.

6. An electrostatic capacitance detection device to detect a change in electrostatic capacitance based on an electric field formed between electrodes, the electrodes comprising a first electrode and a second electrode comprising conductive patterns defining profiles of the electrodes, the electrostatic capacitance detection device comprising:

the first electrode corresponding to one of the electrodes;

the second electrode corresponding to another of the electrodes, at least a part of the second electrode being opposed to the first electrode across a transport path extending in a transport direction in which a detection target having a sheet shape is transported;
a first floating electrode disposed on a side of the first electrode opposite to the transport path; and
a second floating electrode disposed on a side of the second electrode opposite to the transport path,
wherein at least one of the first floating electrode or the second floating electrode is supplied with an electric potential or is connected to a feeder line.

7. The electrostatic capacitance detection device according to claim 6, wherein at least one of the first electrode or the second electrode comprises a second electric field adjuster for adjusting the electric field, the second electric field adjuster comprising a ground pattern around the electrode via an outer gap disposed outside the profile.

8. The electrostatic capacitance detection device according to claim 7, wherein the ground pattern surrounds the at least one of the first electrode or the second electrode via the outer gap.

9. The electrostatic capacitance detection device according to claim 6, wherein
the first electrode and the second electrode are located in the transport path at a position downstream of a first image reader in the transport direction, the first image reader reading an image of the detection target at a first reading position,
the first electrode and the second electrode are located in the transport path at a position upstream of a second image reader in the transport direction, the second image reader reading an image of the detection target at a second reading position, and
the first electrode and the second electrode are located between the first reading position and the second reading position.

10. An image reading apparatus comprising:
the electrostatic capacitance detection device according to claim 9;
the first image reader; and
the second image reader.

11. An electrostatic capacitance detection device to detect a change in electrostatic capacitance based on an electric field formed between electrodes, the electrostatic capacitance device comprising:
a first electrode corresponding to one of the electrodes; and
a second electrode corresponding to another of the electrodes, at least a part of the second electrode being opposed to the first electrode across a transport path extending in a transport direction in which a detection target having a sheet shape is transported, wherein
the first electrode and the second electrode comprise conductive patterns defining profiles of the electrodes, and
at least one of the first electrode or the second electrode comprises a first electric field adjuster for adjusting the electric field, the first electric field adjuster comprising at least one of three types including an inner gap formed inside the profile and having a shape defined by a hollow formed in the conductive pattern, a notch extending inward from the profile, and a serration defined by the profile comprising a serrated edge.

12. The electrostatic capacitance detection device according to claim 11, wherein
the first electrode and the second electrode extend in a cross direction intersecting the transport direction, and
the first electric field adjuster defines a portion comprising the conductive patterns discontinuous in the transport direction at any position in the cross direction, or defines a portion comprising the conductive patterns having mutually different lengths in the transport direction at any position in the cross direction.

13. The electrostatic capacitance detection device according to claim 12, wherein
the inner gap is formed inside the profile and has a circular shape or a polygonal shape defined by a hollow formed in the conductive pattern,
the notch defines the profile having at least one of a Π shape, an E shape, or a step shape, and
the serration defines the profile comprising at least one of a triangular serrated edge, a rectangular serrated edge, or a wave-like serrated edge.

14. The electrostatic capacitance detection device according to claim 11, wherein
the inner gap is formed inside the profile and has a circular shape or a polygonal shape defined by a hollow formed in the conductive pattern,
the notch defines the profile having at least one of a Π shape, an E shape, or a step shape, and
the serration defines the profile comprising at least one of a triangular serrated edge, a rectangular serrated edge, or a wave-like serrated edge.

15. The electrostatic capacitance detection device according to claim 11, wherein at least one of the first electrode or the second electrode comprises a second electric field adjuster for adjusting the electric field, the second electric field adjuster comprising a ground pattern around the electrode via an outer gap disposed outside the profile.

16. The electrostatic capacitance detection device according to claim 15, wherein the ground pattern surrounds the at least one of the first electrode or the second electrode via the outer gap.

17. The electrostatic capacitance detection device according to claim 11, wherein
the first electrode and the second electrode are located in the transport path at a position downstream of a first image reader in the transport direction, the first image reader reading an image of the detection target at a first reading position,
the first electrode and the second electrode are located in the transport path at a position upstream of a second image reader in the transport direction, the second image reader reading an image of the detection target at a second reading position, and
the first electrode and the second electrode are located between the first reading position and the second reading position.

18. An image reading apparatus comprising:
the electrostatic capacitance detection device according to claim 17;
the first image reader; and
the second image reader.

* * * * *